US011611228B2

(12) United States Patent
Liu et al.

(10) Patent No.: US 11,611,228 B2
(45) Date of Patent: Mar. 21, 2023

(54) POWER CYCLE MODULATION CONTROL FOR POWER CONVERTERS

(71) Applicant: Queen's University at Kingston, Kingston (CA)

(72) Inventors: Yan-Fei Liu, Kingston (CA); Yang Chen, Hefei (CN); Wenbo Liu, Kingston (CA)

(73) Assignee: Queen's University at Kingston, Kingston (CA)

( * ) Notice: Subject to any disclaimer, the term of this patent is extended or adjusted under 35 U.S.C. 154(b) by 196 days.

(21) Appl. No.: 17/276,664

(22) PCT Filed: Sep. 17, 2019

(86) PCT No.: PCT/CA2019/051317
§ 371 (c)(1),
(2) Date: Mar. 16, 2021

(87) PCT Pub. No.: WO2020/056503
PCT Pub. Date: Mar. 26, 2020

(65) Prior Publication Data
US 2022/0038015 A1 Feb. 3, 2022

Related U.S. Application Data

(60) Provisional application No. 62/733,155, filed on Sep. 19, 2018, provisional application No. 62/732,036, filed on Sep. 17, 2018.

(51) Int. Cl.
*H02M 3/00* (2006.01)
*H02J 7/00* (2006.01)
(Continued)

(52) U.S. Cl.
CPC ......... *H02J 7/0063* (2013.01); *H02M 1/0009* (2021.05); *H02M 1/0012* (2021.05);
(Continued)

(58) Field of Classification Search
CPC ...... H02M 1/0058; H02M 3/01; H02M 3/015; H02M 7/4811; H02M 7/4815; H02M 7/4826; H02M 7/4818
See application file for complete search history.

(56) References Cited

U.S. PATENT DOCUMENTS

| 2004/0184289 A1* | 9/2004 | Vinciarelli | H02J 1/102 |
| | | | 363/15 |
| 2009/0310387 A1* | 12/2009 | Lu | H02M 3/3376 |
| | | | 363/21.03 |

(Continued)

FOREIGN PATENT DOCUMENTS

CA 2001259 6/1990

OTHER PUBLICATIONS

International Search Report and Written Opinion for corresponding International Application No. PCT/CA2019/051317 filed on Sep. 17, 2019.

(Continued)

*Primary Examiner* — Gary A Nash
(74) *Attorney, Agent, or Firm* — Stephen J. Scribner

(57) ABSTRACT

Controllers and methods for controlling a resonant power converter output voltage include operating the power converter according to a control period comprising an on cycle operation mode for a duration T_on that produces a first voltage Vo1 and an off cycle operation mode for a duration T_off that produces a second voltage Vo2. Vo1 is produced using a first switching frequency for a first selected number of switching cycles corresponding to the on time T_on. The converter output voltage or the converter input and output voltages may be sensed and used to determine the switching frequency during the on cycle operation mode and the duration of the off cycle operation mode. The final output voltage of the power converter is regulated to a selected value based on a ration of (T_on):(T_on+T_off). The con- (Continued)

trollers and methods may be used with power converters in power delivery devices to accept wide input voltage ranges compatible with devices such as cell phones, tablet computers, and notebook computers.

22 Claims, 20 Drawing Sheets

(51) Int. Cl.
  H02M 1/00 (2006.01)
  H02M 1/10 (2006.01)
  H02M 3/335 (2006.01)

(52) U.S. Cl.
  CPC ....... H02M 1/0025 (2021.05); H02M 1/0058 (2021.05); H02M 1/10 (2013.01); H02M 3/01 (2021.05); H02M 3/015 (2021.05); H02M 3/33576 (2013.01)

(56) References Cited

U.S. PATENT DOCUMENTS

| | | | |
|---|---|---|---|
| 2010/0181306 A1 | 7/2010 | Gutierrez et al. | |
| 2011/0242856 A1* | 10/2011 | Halberstadt | H02M 3/3376 363/21.02 |
| 2011/0267844 A1* | 11/2011 | He | H02M 3/3378 363/21.02 |
| 2012/0163039 A1* | 6/2012 | Halberstadt | H02M 3/3376 363/21.02 |
| 2012/0281434 A1* | 11/2012 | Lin | H02M 3/3376 363/21.02 |
| 2013/0229829 A1* | 9/2013 | Zhang | H02M 3/3376 363/16 |

OTHER PUBLICATIONS

Feng, W., et al., "Optimal Trajectory Control of Burst Mode for LLC Resonant Converter", IEEE Transactions on Power Electronics, vol. 28, No. 1, pp. 457-466, (2013).

Forsyth, A.J., et al., "Extended Fundamental Frequency Analysis of the LLC Resonant Converter", IEEE Transactions on Power Electronics, vol. 18, No. 6, pp. 1286-1292, (2003).

Yang, B. et al., "LLC Resonant Converter for Front End DC/DC Conversion", IEEE, pp. 1108-1112, (2002).

Holtz, J., "Pulsewidth Modulation for Electronic Power Conversion", Proceedings of the IEEE, vol. 82, No. 8, pp. 1194-1214, (1994).

Witulski. A.F., "Steady-State Analysis of the Series Resonant Converter", IEEE Transactions On Aerospace and Electronic Systems, vol. AES. 21, No. 6, pp. 791-799, (1985).

* cited by examiner

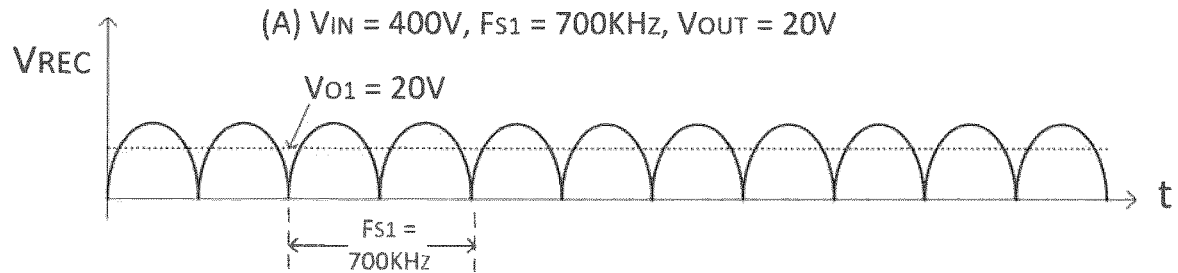
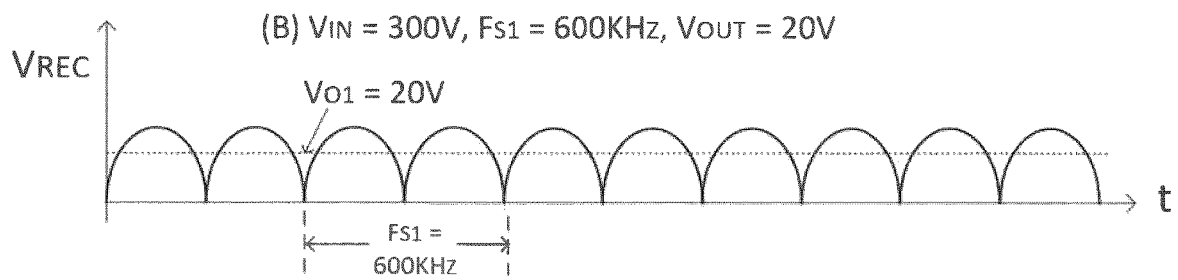
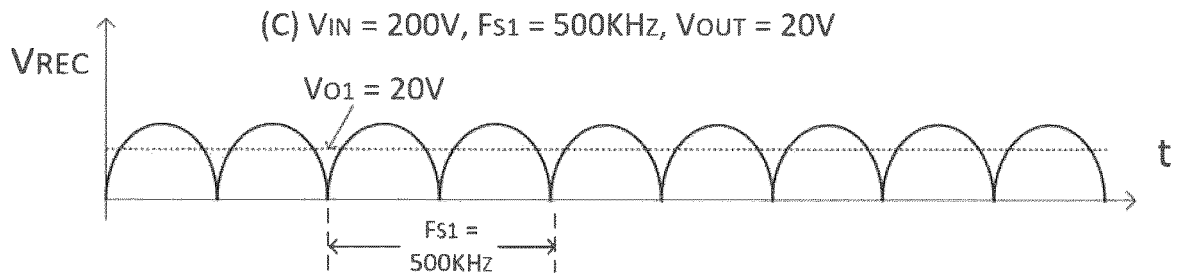
Figs 10A, 10B, and 10C
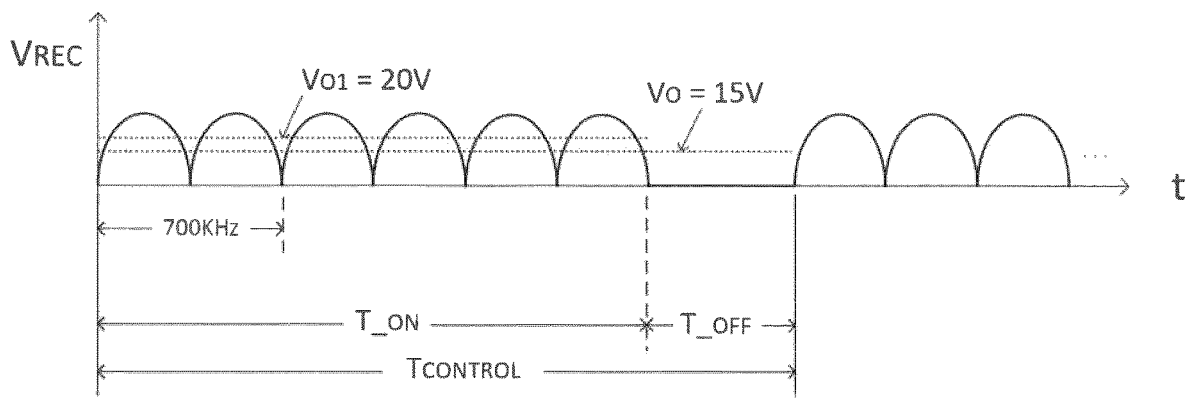
Fig. 11

POWER CYCLE MODULATION CONTROL FOR POWER CONVERTERS

RELATED APPLICATIONS

This application is a 371 of International Application No. PCT/CA2019/051317 filed on Sep. 17, 2019, and claims the benefit of the filing date of Application No. 62/733,155 filed on Sep. 19, 2018 and Application No. 62/732,036 filed on Sep. 17, 2018, the contents of all of which are incorporated herein by reference in their entirety.

FIELD

This invention relates to controllers for power converters. More particularly, the invention relates to controllers and control methods that allow power converters, such as resonant power converters, to operate with wide input voltage ranges and wide output voltage ranges.

BACKGROUND

Currently, the USB Power Delivery standard (USB-PD) is proposed to solve the problem of incompatible output voltage levels of power adapters of cell phones, tablets, and notebook computers. PD-compatible power adapters are able to convert a universal AC voltage to DC voltage and provide an output voltage adjustable from 5V to 20V for portable devices, such as cell phones, tablets, and notebook computers. The power adapter will communicate with the device it is charging (such as notebook computer, tablet, or a cell phone), and then produce the required output voltage level that matches the need of the device. Therefore, the same power adapter can be used for multiple devices which are compatible with USB-PD.

A resonant converter is a good choice to implement a USB-PD charger because of features such as zero-voltage switching (ZVS) and high switching frequency operation which reduces the overall size of the power adapter. This is especially true when a switching device such as GaN switch is used, which can achieve high efficiency and small size in power adapter applications.

However, in order to achieve 5V to 20V output variation range, the switching frequency of the resonant converter must be changed over wide range (such as a 3:1 ratio, or greater), which compromises the design. If the voltage gain variation range is designed to be very wide, the performance (such as the efficiency, power density, etc.) will be degraded. For example, under the condition of input voltage of 200V DC, if the output voltage is 5V, the required voltage gain is 0.025 (5V/200V). If the output voltage is 9V, the required voltage gain is 0.045 (9V/200V). If the output voltage is 20V, the required voltage gain is 0.1 (20V/200V). That is, the voltage gain variation for the resonant converter must vary from 0.025 to 0.1, or a range of 4:1 for the fixed input voltage of 200V DC. If input voltage variation is considered, the required voltage gain variation will be even higher. In this case, the resonant converter has to operate in a very wide frequency range and the efficiency and power density is sacrificed.

In addition to the USB-PD application, several other applications also require very wide voltage gain variation range. One example is the DC-DC converter of an Electric Vehicle (EV) power system. It is commonly designed to accommodate 9V to 16V output voltage level with 240V to 430V input voltage level. Therefore, the highest voltage gain requirement of the converter is 16V/240V=0.067 and the lowest voltage gain requirement is 9V/430V=0.021. In this case, the required voltage gain variation is from 0.021 to 0.067, or a variation range of 3.2:1. This is also a very challenging requirement for resonant converters. To maintain such a large voltage gain variation range, the design of the resonant converter is compromised and efficiency cannot be optimized.

SUMMARY

According to one aspect of the invention there is provided a method for controlling a resonant power converter output voltage, comprising: operating the power converter according to a control period Tcontrol comprising an on cycle operation mode for a duration T_on and an off cycle operation mode for a duration T_off; sensing a converter output voltage and using the sensed output voltage to select a switching frequency Fs1 during the on cycle operation mode, a first selected number of switching cycles corresponding to the duration T_on, and the duration T_off; wherein an output voltage Vo of the power converter is regulated to a selected value based on a ratio of (T_on):(T_on+T_off).

In one embodiment the method comprises producing a first voltage Vo1 during T_on and producing a second voltage Vo2 during T_off. In one embodiment the method comprises producing Vo1 during T_on using a first switching frequency and producing Vo2 during T_off using a second switching frequency. In one embodiment the first switching frequency is greater than the second switching frequency.

In one embodiment the method comprises selecting a minimum value T_off_min for the duration of T_off, wherein T_off_min is less than 25% of Tcontrol. In one embodiment, T_off_min is 0.

In one embodiment the duration of T on is equal to a first selected number of switching cycles N1, wherein one switching cycle is 1/Fs1.

In one embodiment Tcontrol comprises only the on cycle operation mode of duration T on.

In one embodiment the method comprises turning the power converter off for a second selected number of switching cycles corresponding to the duration T_off.

In one embodiment the method comprises adjusting the switching frequency during the on cycle operation mode.

In one embodiment the method comprises using at least first and second switching frequencies during the on cycle operation mode.

In one embodiment the method comprises sensing a converter input voltage and the converter output voltage; using the sensed input and output voltages to select the switching frequency during T_on and the number of switching cycles corresponding to the duration T_on; and using the sensed output voltage to select the duration T_off.

In one embodiment the method comprises sensing a converter input voltage and the converter output voltage; using the sensed input and output voltages to select the switching frequency during T_on, the number of switching cycles corresponding to the duration T_on, and the duration T off.

In one embodiment the method comprises sensing a converter input voltage and the converter output voltage; using the sensed input and output voltages to select the number of switching cycles corresponding to the duration T_on; and using the sensed output voltage to select the switching frequency during T_on and the duration T off.

In one embodiment the method comprises sensing a converter input voltage and a converter output voltage; using the sensed input and output voltages to select the number of switching cycles corresponding to the duration T_on and the duration T_off; and using the sensed output voltage to select the switching frequency during T_on.

In various embodiments the power converter may be a parallel resonant converter, a series resonant converter, a LLC resonant converter, or a LCC resonant converter.

According to another aspect of the invention there is provided a controller for a power converter, wherein the controller implements a method as described herein. In one embodiment the controller may be implemented in digital technology. In various embodiments, the power converter may be a parallel resonant converter, a series resonant converter, a LLC resonant converter, or a LCC resonant converter.

According to another aspect of the invention there is provided a power converter comprising a controller as described herein. In various embodiments, the power converter may be a parallel resonant converter, a series resonant converter, a LLC resonant converter, or a LCC resonant converter. In various embodiments the power converter power converter provides output voltages compatible with a plurality of devices such as cell phones, tablet computers, and notebook computers, and the like.

BRIEF DESCRIPTION OF THE DRAWINGS

For a greater understanding of the invention, and to show more clearly how it may be carried into effect, embodiments will be described, by way of example, with reference to the accompanying drawings, wherein:

FIGS. 10A, 10B, and 10C are diagrams showing control strategies for an output voltage of 20V with input voltages of (A) 400V, (B) 300V, and (C) 200V, according to one embodiment.

FIG. 11 is a diagram showing a control strategy for an output voltage of 15V with input voltage of 400V, according to one embodiment.

DETAILED DESCRIPTION OF EMBODIMENTS

According to a broad aspect of the invention there is provided a Power Cycle Modulation (PCM) control method for controlling the output voltage of a resonant converter in order to deliver wide output voltage variation range (e.g., 5V to 20V) over a wide input voltage variation range (e.g., 120V to 220V) with limited switching frequency variation range (e.g., less than 1.5:1), while achieving high efficiency operation.

1. Power Cycle Modulation Control of Parallel Resonant Converter

Figure 1A:
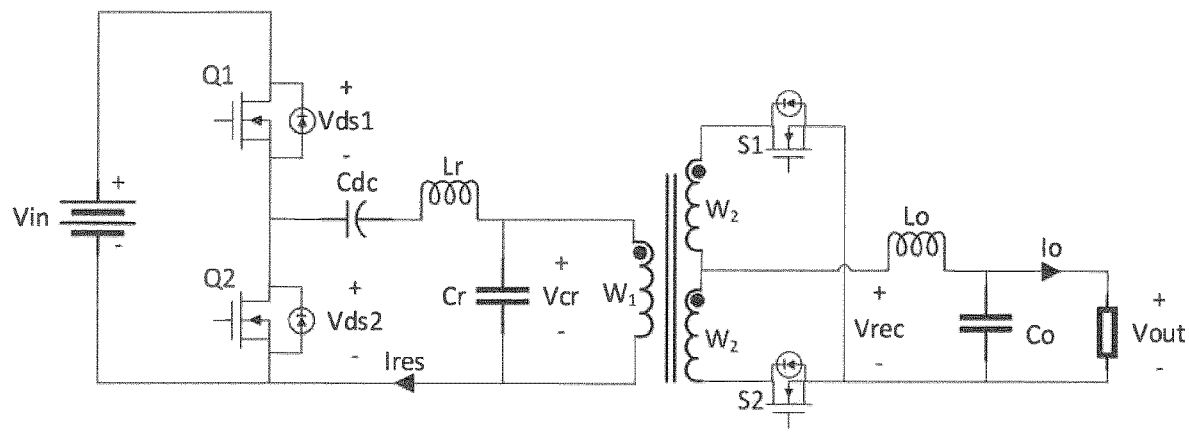
FIG. 1A is a schematic diagram of a half bridge parallel resonant converter (PRC), according to the prior art.
Figure 1B:
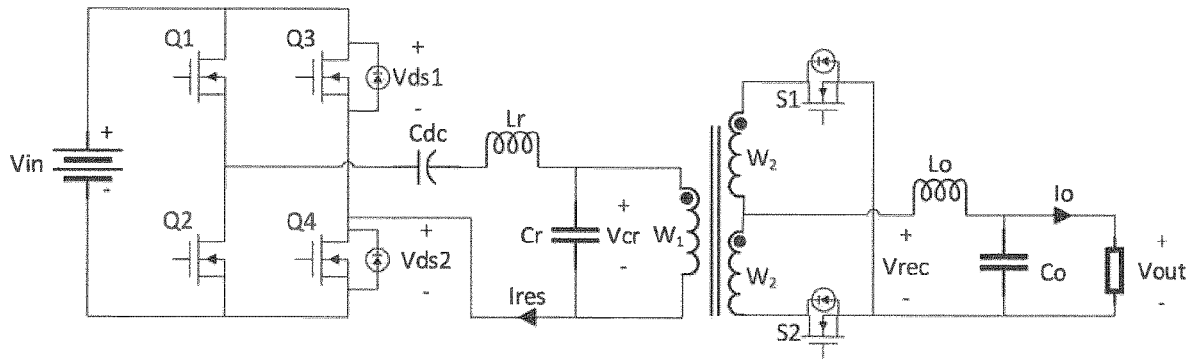
FIG. 1B is a schematic diagram of a full bridge parallel resonant converter, according to the prior art.

A parallel resonant converter (PRC) is used as an example to illustrate the general operation of PCM control as described herein. In a PRC the switching frequency Fs is used to control the output voltage. Different switching frequencies will produce different output voltages. FIGS. 1A and 1B are circuit diagrams showing conventional half-bridge and full-bridge resonant converts, respectively. Both topologies have primary side resonant components including a series inductor Lr and parallel capacitor Cr. The voltage across the parallel resonant capacitor Vcr is rectified by synchronous rectifiers S1 and S2 on the secondary side, and is filtered by the output filter Lo and Co. The converter output is equivalent to a voltage source and (YFL) the output LC filter is needed to generate the DC output voltage Vout.

Figure 2:
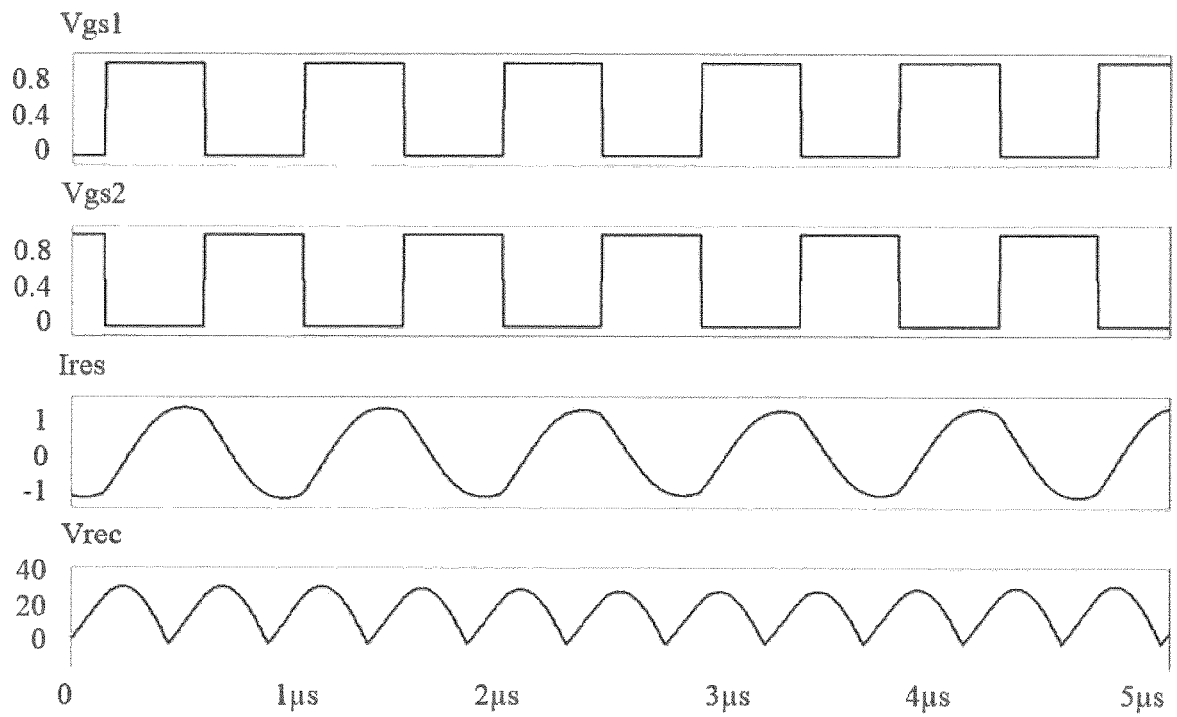
FIG. 2 shows waveforms of the conventional parallel resonant converter of FIG. 1A.

FIG. 2 shows typical waveforms of a conventional half-bridge PRC under switching frequency control. The top waveform is the gate drive signal of the top switch Q1, Vgs1. The second waveform is the gate drive signal of the bottom switch Q2, Vgs2. The third waveform is the resonant current, Ires, and the bottom waveform is the voltage Vrec across the input side of the output filter, Lo, Co.

When the switching frequency changes, the voltage across the parallel capacitor Cr will change and the average voltage of the rectified voltage Vrec at the secondary side will also change. The average value of Vrec is the output voltage as the average voltage across the filter inductor Lo is zero. When the switching frequency is at Fs1, the peak value across capacitor Cr is VCr1, the average voltage of the rectified voltage is Vrec1, which is the same as the output voltage Vo1. When the switching frequency is Fs2 (Fs2>Fs1), VCr2 will be less than VCr1, and the average value of the rectified voltage Vrec2<Vrec1, and therefore, Vo2=Vrec2<Vo1. It is noted that in order to achieve zero voltage switching, the switching frequency of the parallel resonant converter is higher than the resonant frequency.

It is noted that at switching frequency Fs1, the converter will produce output voltage Vo1 and at switching frequency of Fs2, the converter will produce output voltage Vo2. In the above case, Fs1 is higher than Fs2 (Fs1>Fs2) and Vo1 is higher than Vo2 (Vo1>Vo2).

Figure 3:
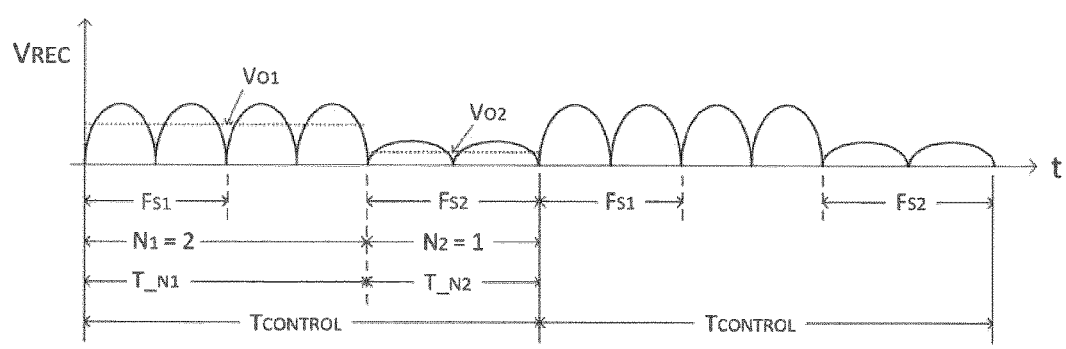
FIG. 3 is a diagram showing an output voltage Vrec waveform and control of switching frequency for an implementation of power cycle modulation with a parallel resonant converter, according to a generalized embodiment wherein N1=2 and N2=1.

In contrast to the conventional PRC operation, operation of a resonant converter with power cycle modulation according to one embodiment includes the following:

1. The resonant converter operates at Fs1 for a pre-determined number of switching cycles, as indicated by N1 switching at switching frequency of Fs1; this operation mode is defined as on cycle operation mode.
2. At the end of switching cycle N1, the resonant converter operates at Fs2 for another pre-determined number of switching cycles, as indicated by N2; this operation mode is defined as off cycle operation mode.
3. At the end of off cycle operation mode, the resonant converter operates at on cycle operation mode again.
4. The above sequence is repeated. The waveforms (when N1=2 and N2=1) are illustrated in FIG. 3. In this case the output voltage may be calculated as $$Vo=(N1*Ts1*Vo1+N2*Ts2*Vo2)/T\text{control} \quad (1)$$

Where Tcontrol=N1*Ts1+N2*Ts2 is the time period for one complete control cycle. The Power Cycle Ratio (PCR) is defined as $$PCR=N1*Ts1/T\text{control} \quad (2)$$

Ts1=1/Fs1 and Ts2=1/Fs2. Ts1 and Ts2 are the switching periods of the two switching frequencies. It is noted that the voltage waveform Vrec shown in FIG. 3 is the rectified voltage at the secondary side. Therefore, N1 has four half sinusoidal waveforms (for N1=2 switching cycles) and N2 has two half sinusoidal waveforms (for N2=1 switching cycle). It will be appreciated that in an actual implementation, the waveform of Vrec is not a pure sinusoidal waveform. In order to simplify the illustration, a sinusoidal waveform is assumed in this description. However, the description and results are applicable to real waveforms in actual implementations, which are close to a sinusoidal waveform.

In addition, the average voltage during N1 is Vo1 and the average voltage during N2 is Vo2. The time period for one control cycle is Tcontrol.

It is observed from the above equations (1) and (2) that by adjusting the PCR, the output voltage can be adjusted. If we assume that with a particular set of parallel resonant converter parameters, Vo2=0.25*Vo1 for Fs1=500 kHz (Ts1=2 us) and Fs2=1 MHz (Ts2=1 us). Then by selecting N1=2 and N2=1, the output voltage Vo may be calculated as:

$$Vo=(2*2\text{ us}*Vo1+1*1\text{ us}*0.25*Vo1)/(2*2\text{ us}+1*1\text{ us})=0.85Vo1 \quad (3)$$

Table 1 gives examples of the output voltage with different N1 and N2 values. In the calculations, it is assumed that Vo2=0.25Vo1. In Table 1, T on=N1*Ts1 and T off=N2*Ts2. T_on is the time period when the converter operates at on cycle operation mode when the switching frequency is Fs1. T_off is the time period when the converter operates at off cycle operation mode when the switching frequency is Fs2.

TABLE 1

Calculated Vo with different N1 and N2 and with Vo2 = 0.25 Vo1.

| Vo1 | Vo2 | N1 | N2 | T_on(us) | Toff(us) | Vo |
|---|---|---|---|---|---|---|
| 1 | 0.25 | 3 | 0 | 6 | 0 | 1.00 |
| 1 | 0.25 | 3 | 1 | 6 | 1 | 0.89 |
| 1 | 0.25 | 3 | 2 | 6 | 2 | 0.81 |
| 1 | 0.25 | 3 | 3 | 6 | 3 | 0.75 |
| 1 | 0.25 | 3 | 4 | 6 | 4 | 0.70 |
| 1 | 0.25 | 3 | 5 | 6 | 5 | 0.66 |
| 1 | 0.25 | 3 | 6 | 6 | 6 | 0.63 |
| 1 | 0.25 | 3 | 7 | 6 | 7 | 0.60 |
| 1 | 0.25 | 3 | 8 | 6 | 8 | 0.57 |
| 1 | 0.25 | 3 | 9 | 6 | 9 | 0.55 |
| 1 | 0.25 | 3 | 10 | 6 | 10 | 0.53 |
| 1 | 0.25 | 1 | 1 | 2 | 1 | 0.75 |
| 1 | 0.25 | 1 | 2 | 2 | 2 | 0.63 |
| 1 | 0.25 | 1 | 3 | 2 | 3 | 0.55 |
| 1 | 0.25 | 1 | 4 | 2 | 4 | 0.50 |
| 1 | 0.25 | 1 | 5 | 2 | 5 | 0.46 |
| 1 | 0.25 | 1 | 6 | 2 | 6 | 0.44 |
| 1 | 0.25 | 1 | 7 | 2 | 7 | 0.42 |
| 1 | 0.25 | 1 | 8 | 2 | 8 | 0.40 |
| 1 | 0.25 | 1 | 9 | 2 | 9 | 0.39 |
| 1 | 0.25 | 1 | 10 | 2 | 10 | 0.38 |

In Table 1, N2=0 means that the converter operates at on cycle operation mode all the time. That is, the switching frequency is Fs1 all the time.

For example, when N=3 and N2=5, T on=3*2 us=6 us and T off=5*1 us=5 us. The output voltage Vo=(Vo1*6 us+0.25Vo1*5 us)/(6 us+5 us)=0.66Vo1.

It is observed from Table 1 that the output voltage can be regulated down to 0.26 of Vo1, which means that by operating the resonant converter with two discrete switching frequencies, the output voltage can be regulated over a wide range, from 0.26 Vo1 to Vo1, a variation of approximately 4:1.

Figure 4:
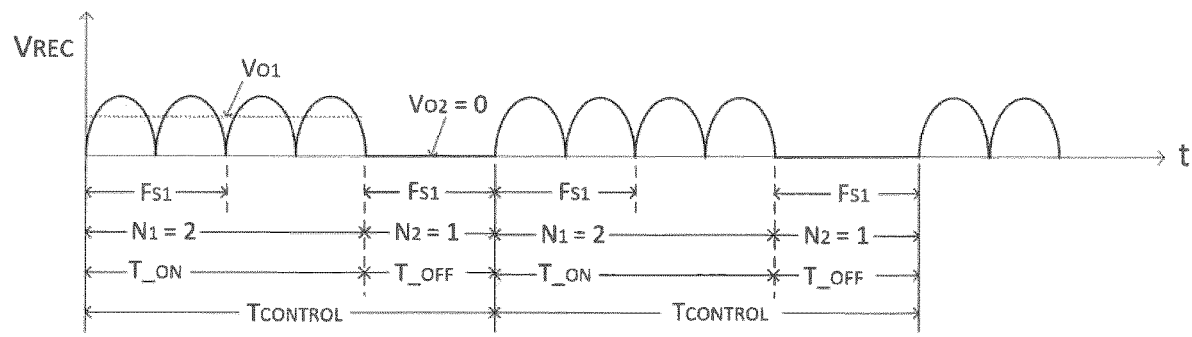
FIG. 4 is a diagram showing an output voltage Vrec waveform and control of switching frequency for an implementation of power cycle modulation with a parallel resonant converter, according to an embodiment wherein N1=2 and N2=1, and Vo2 is set to zero.

It is further noted from the above analysis that it is desirable to make Vo2=0 to further increase the output voltage variation range. This means that during off cycle operation, the parallel resonant converter stops switching, or both Q1 and Q2 are off during off cycle operating mode. FIG. 4 shows the Vrec waveform under this operating condition, still under N1=2 and N2=1.

In this condition, the operation of the PCM control may be described as follows:
1. The resonant converter operates at on cycle operation mode with switching frequency of Fs1 for a pre-determined number of switching cycles, such as N1 cycles.
2. At the end of on cycle operation mode, the resonant converter stops operating (operates at off cycle operation mode) for another pre-determined number of switching cycles, as indicated by N2, or by T_off time period.
3. At the end of off cycle operation mode, (after T_off time period), the resonant converter operates at on cycle operation mode again (Fs1 for N1 cycles). The operation repeats itself.

It is noted that during off cycle operation mode, the resonant converter does not use any power (or any energy) from the input source. In the example of a half-bridge converter (e.g., FIG. 1A), Q1 (the high side switch) is turned off (gate voltage of Q1 is low) in order to meet this requirement (no energy is used from the source). The status of switch Q2 (low side switch) may be set according to two conditions. The first condition is that Q2 is in off position (gate voltage of Q2 is low). The second condition is that Q2 is on (the gate voltage of Q2 is high). That is, the gate voltage for Q1 is low and the gate voltage for Q2 is high. For full bridge implementations, e.g., as shown in FIG. 1B, during off cycle operation mode, the switches Q1 and Q3 are off so that no energy is used from the input source. In one embodiment, an operating condition for Q2 and Q4 is that both Q2 and Q4 are on (gate voltage of Q2 and Q4 are high). Another possible condition is that both Q2 and Q4 are off (gate voltage of Q2 and Q4 are low). In actual operating conditions, the status of Q2 (for half bridge configuration) or Q2 and Q4 (for full bridge configuration) during off cycle operation mode does not impact the operation of the PCM control method embodiments.

The following description is based on a half bridge converter, however, the approach is applicable to both half bridge and full bridge implementations. If it is assumed that Fs1=500 KHz and Vo=Vo1 during on cycle operation mode, then the converter will operate N1 switching cycles with switching period of 2 us (Ts=Ts1, Ts1=1/Fs1) and the converter operates at off cycle operation mode (or stop switching) for N2 switching cycles (also with Ts=Ts1=2 us) with both Q1 and Q2 off. In Table 2, T on=N1*Ts1 and T off=N2*Ts1. T on is the time when the converter operates at on cycle operation mode and T_off is the time when the converter operates at off cycle operation mode. In this description, the term "stop switching" refers to the operating condition of Q1 off during off cycle operation mode, which lasts for one or more switching cycles. Then the output voltage may be calculated with the following equation:

$$Vo=(N1*Ts1*Vo1)/Tcontrol \qquad (4)$$

Where Tcontrol=N1*Ts1+N2*Ts1. Table 2 gives examples of the output voltage with different N1 and N2 values.

TABLE 2

Calculated Vo with different N1 and N2 and with Vo2 = 0.

| Case | Vo1 | Vo2 | N1 | N2 | T_on(us) | T_off(us) | Vo |
|---|---|---|---|---|---|---|---|
| 1 | 1 | 0 | 3 | 1 | 6 | 2 | 0.75 |
| 2 | 1 | 0 | 3 | 2 | 6 | 4 | 0.60 |
| 3 | 1 | 0 | 3 | 3 | 6 | 6 | 0.50 |
| 4 | 1 | 0 | 3 | 4 | 6 | 8 | 0.43 |
| 5 | 1 | 0 | 3 | 5 | 6 | 10 | 0.38 |
| 6 | 1 | 0 | 1 | 1 | 2 | 2 | 0.50 |
| 7 | 1 | 0 | 1 | 2 | 2 | 4 | 0.33 |
| 8 | 1 | 0 | 1 | 3 | 2 | 6 | 0.25 |
| 9 | 1 | 0 | 1 | 4 | 2 | 8 | 0.20 |
| 10 | 1 | 0 | 1 | 5 | 2 | 10 | 0.17 |

It is observed that the output voltage can be regulated at wide range while the resonant converter operates at a fixed switching frequency (such as 500 KHz).

However, it is noted from Table 1 and Table 2 that N1 and N2 are, generally, integers and T_on and T off are also discrete numbers. Therefore, the output voltage cannot be adjusted continuously. The output voltage can only be adjusted in steps.

The following methods may be used to adjust the output voltage Vo with much smaller steps (i.e., with higher resolution), and/or more accurately.

Method 1A: Fs1 Adjustment

In this method the switching frequency (Fs1) is adjusted during on cycle operation mode slightly (e.g., +/−3%, or +/−5%, or +/−7%, or +/−10%, etc.) and therefore, Vo1 may be changed slightly. For example, in the case of setting Vo2=0 during off cycle operation mode (N2 switching cycles when the resonant converter stops operation), if it is assumed that during on cycle operation mode, the output voltage will increase by 1% if the switching frequency is reduced by 1%, then the output voltage can be adjusted by changing the switching frequency during on cycle operation mode. It is noted that when the switching frequency is reduced, the output voltage increases. Table 3 shows the output voltage variation range when N1=3 and N2=2 with Fs1 changes of +/−5%.

TABLE 3

Frequency variation to fine tune the output voltage.

| Fs1% | Fs1(KHz) | Ts1(us) | Vo1 | Vo2 | N1 | N2 | T_on(us) | T_off(us) | Vo |
|---|---|---|---|---|---|---|---|---|---|
| −5% | 475 | 2.105 | 21.00 | 0 | 3 | 2 | 6.316 | 4.211 | 12.60 |
| −4% | 480 | 2.083 | 20.80 | 0 | 3 | 2 | 6.250 | 4.167 | 12.48 |
| −3% | 485 | 2.062 | 20.60 | 0 | 3 | 2 | 6.186 | 4.124 | 12.36 |
| −2% | 490 | 2.041 | 20.40 | 0 | 3 | 2 | 6.122 | 4.082 | 12.24 |
| −1% | 495 | 2.020 | 20.20 | 0 | 3 | 2 | 6.061 | 4.040 | 12.12 |
| 0% | 500 | 2.000 | 20.00 | 0 | 3 | 2 | 6.000 | 4.000 | 12.00 |
| 1% | 505 | 1.980 | 19.80 | 0 | 3 | 2 | 5.941 | 3.960 | 11.88 |
| 2% | 510 | 1.961 | 19.60 | 0 | 3 | 2 | 5.882 | 3.922 | 11.76 |
| 3% | 515 | 1.942 | 19.40 | 0 | 3 | 2 | 5.825 | 3.883 | 11.64 |
| 4% | 520 | 1.923 | 19.20 | 0 | 3 | 2 | 5.769 | 3.846 | 11.52 |
| 5% | 525 | 1.904 | 19.00 | 0 | 3 | 2 | 5.714 | 3.811 | 11.40 |

Table 3 shows that if the switching frequency is 500 KHz, the output voltage is 12V. When the switching frequency is increased by 1%, the output voltage is reduced by 1% to 11.88V, and vice versa. Therefore, the output voltage can be adjusted by changing the switching frequency.

Method 1B: Vary Fs1 During on Cycle Operation Mode

Figure 5:
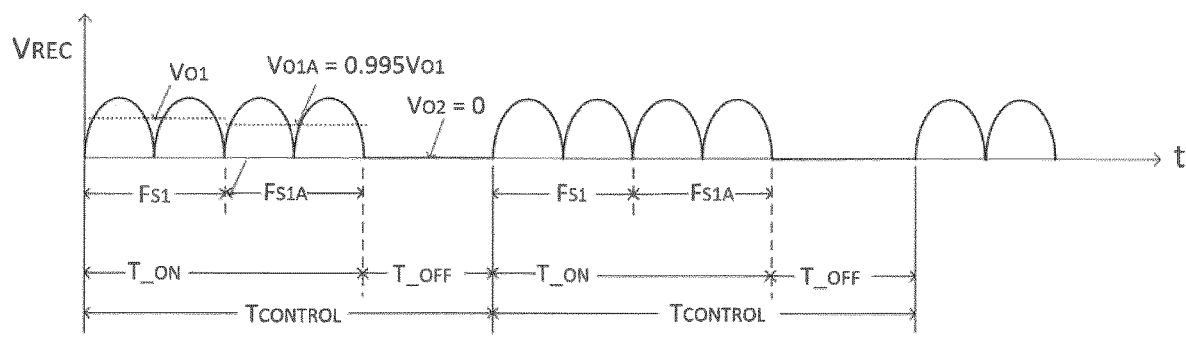
FIG. 5 is a diagram showing an output voltage Vrec waveform and control of switching frequency for an implementation of power cycle modulation with a parallel resonant converter, according to an embodiment wherein different switching frequencies are used during the on cycle operation mode.

Another method is to use slightly different switching frequencies within the on cycle operation mode. For example, during the on cycle operation mode, the switching frequency of the first cycle can be set as Fs1 and the switching frequency of the second cycle can be set to Fs1A, as shown in FIG. 5. Then, the output voltage can be adjusted with more accuracy.

For example, referring to FIG. 5, Fs1=500 kHz and Fs1A=505 kHz. It is assumed that when the switching frequency is increased by 1%, the output voltage will be reduced by 0.5%. Then the output voltage may be calculated as:

$$Vo = (Vo1*2\ us + 1.005 Vo1*2\ us/0.99)/Tcontrol = 4.03\ Vo1/Tcontrol\ Tcontrol = 2\ us + 2\ us/0.99 + 2\ us = 6.02\ us\ Vo = 0.6694\ Vo1 \quad (5)$$

It is noted that with the case as shown in FIG. 4, where Fs1=500 kHz for 2 cycles (N1=2), T_on=4 us and T_off=2 us, the output voltage will be:

$$Vo = Vo1*2\ us*2/6\ us = 0.6667 Vo1 \quad (6)$$

The difference between equations (5) and (6) is (0.6694−0.6667) Vo1=0.0027 Vo1=0.27% Vo1.

Thus, the output voltage can be adjusted within the accuracy of 0.27% of Vo1 when the switching frequency within the same on cycle operation mode is adjusted slightly. It is noted that with digital control using, e.g., a microcontroller unit (MCU), it is straight-forward to change the switching frequency within the same on cycle operation mode.

Method 2: Off Cycle Operation Mode Time Interval Adjustment

Equation (4) may be re-written as follows:

$$Vo = (N1*Ts1*Vo1)/(N1*Ts1 + T\_off) \quad (7)$$

In equation (7), T_off indicates the time interval when the converter operates at off cycle operation mode. Since T_off can be continuously adjusted, the output voltage Vo can also be continuously adjusted. With digital implementation (such as MCU implementation), the accuracy of the time step from the MCU can be as small as, e.g., 1 nanosecond (ns), and the output voltage can be regulated very accurately, in the range of, e.g., 0.01% of the required output voltage. This is more than enough to meet normal requirements. It is noted that the accuracy of the time step of an MCU is normally defined as the LSB (Least Significant Bit). In this example, LSB=1 ns.

It is noted that in this case, the PCR is defined as:

$$PCR = T\_on/(T\_on + T\_off) = T\_on/Tcontrol \quad (2.1)$$

$$T\_on = N1*Ts1, Tcontrol = T\_on + T\_off \quad (2.2)$$

Figure 6:
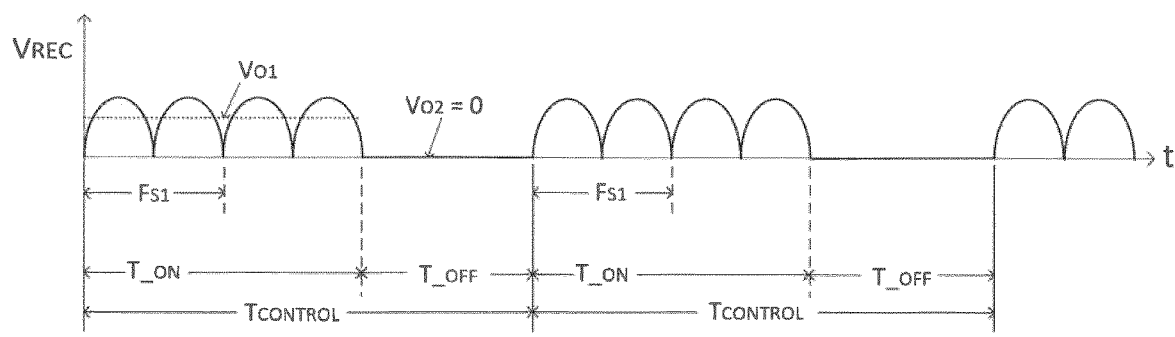
FIG. 6 is a diagram showing an output voltage Vrec waveform and control of switching frequency for an implementation of power cycle modulation with a parallel resonant converter, according to an embodiment wherein T off time is varied.

FIG. 6 shows the rectified voltage waveform Vrec with T_off time adjustment. It is observed that when T_off time is changed, the average output voltage is also changed.

Method 3. Combination of Fs1 Adjustment and T_Off Adjustment

In order to reduce cost, a lower priced MCU is desired. With a lower priced MCU, the time step (LSB) is normally higher, such as 16 ns, or 32 ns. In this case, Fs1 adjustment and T_off adjustment can be used together to achieve accurate output voltage regulation with such an MCU. The following is an example.

It is assumed that (1) Fs1=500 KHz; (2) the LSB of the MCU is T_step=16 ns; (3) when switching frequency is increased by 1%, the output voltage is reduced by 0.5%. It is also assumed that when the on cycle operation mode time period is T_on=8 us and off cycle operation mode time period is T_off=8 us, the output voltage is Vo=10V. That is, the on cycle operates for four switching cycles at 500 KHz switching frequency. Since the time interval for on cycle operation mode and off cycle operation mode is the same, Vo1 in equation (7) is 20V. The following equation describes this operation condition:

$$10V = 4*2\ us*20V/(4*2\ us + 8\ us) \quad (8)$$

If the T_off time is increased by 16 ns (=0.016 us) while the switching frequency during on cycle operation mode is unchanged, the output voltage may be calculated as:

$$Vo\_case1 = 4*2\ us*20V/(4*2\ us + 8\ us + 0.016\ us) = 9.99V = 10V*(1 - 0.1\%) \quad (9)$$

Thus, when the time interval of the off cycle operation mode is increased by one LSB of MCU, the output voltage is reduced by 0.1%.

With MCU implementation, the switching frequency is also generated from the MCU. At 500 KHz switching frequency and 50% duty cycle and assuming the dead time is zero, Q1 (FIG. 1A) will conduct for 1 us and Q2 (FIG. 1A) will conduct for 1 us. In the case of LSB=16 ns, Q1 will conduct for 1 us+16 ns=1.016 us and Q2 will conduct for 1 us+16 ns=1.016 us. Then the switching frequency will change from 500 KHz to 1/(1.016 us+1.016 us)=492 KHz, or 1.6% lower than 500 KHz. Vo1 will increase by 0.8% and is Vo1=20V*1.008=20.16V during on cycle operation mode. In this case, T_on=4*(1.016+1.016)=8.128 us. If the T_off time is set to T off=8 us+16*16 ns=8.256 us, or the T_off time is set to 8 us plus 16 LSB of the MCU clock period. Then, the output voltage may be calculated as:

$$Vo\_case2=8.128*20.16V/(8.128+8.256)=10.00125V=10V*(1+0.0125\%) \quad (10)$$

The above example shows that when Fs1 is changed together with T_off time change, the output voltage can be adjusted to very close to the desired value with error less than 0.01%.

It is observed from the above two examples that the output voltage can be fine-tuned by adjusting the off cycle time operation mode interval (T_off) or by adjusting switching frequency Fs1 or both. With one LSB change of an MCU, the output voltage changes by 1.6% when only Fs1 change is used under the assumption that 1% change of switching frequency will introduce 0.5% change of the output voltage. With one LSB change of T_off, the output voltage changes by 0.1%, which is very accurate. When both Fs1 and T_off are changed, the output voltage error is less than 0.01%, which in practical cases is more than enough for output voltage regulation requirements.

It is noted that an MCU with 16 ns LSB is normally a low priced MCU. If the LSB of the MCU is 1 ns, which is popular, then, with one LSB change, the switching frequency will change from 500 KHz to 1/(1.001 us+1.001 us)=499.5 KHz. The corresponding output voltage change will be 0.05%, which is very small.

It may be concluded that the output voltage fine adjustment can be achieved by switching frequency adjust during on cycle operation mode, or by off cycle operation mode time interval adjustment T_off. Also, when both the Fs1 and T_off are changed, the output voltage can be regulated very accurately.

The above description is based on digital implementations when the time adjustment (or frequency adjustment) is discrete. In embodiments where the control circuit is implemented using an analog circuit, the time adjustment is continuous and then, both Fs1 adjustment and T_off adjustment may be used to achieve output voltage control.

A key feature of the above described PCM control methods is that the time interval of the on cycle operation mode is an integer number of the switching cycles. The time interval of the off cycle operation mode can be independent of the switching cycles, and can be any value as determined by the control need. Of course, the time interval of the off cycle operation mode can be an integer number of the switching cycles.

Two-Loop Control Method

In a practical implementation, the input voltage and output voltage may both have a wide variation range. For example, for a power delivery (PD) application, the input voltage could change from 100V AC to 264V AC and the output voltage could also change from 5V to 20V. In order to reduce the current stress of the resonant converter (such as a parallel resonant converter), it is desirable to use a different switching frequency Fs1 for different input voltages and to use different T_off to adjust the output voltage. For example, in the case of a parallel resonant converter, when the input voltage is high, the switching frequency Fs1 can be selected to a higher value. When the input voltage is lower, Fs1 may be selected as a lower value. In this way, the voltage across the resonant capacitor (Vcr, as shown in FIGS. 1A and 1B) is maintained relatively constant for different input voltages. The output voltage adjustment is then achieved by controlling the T_off time interval.

Figures 7A, 7B:
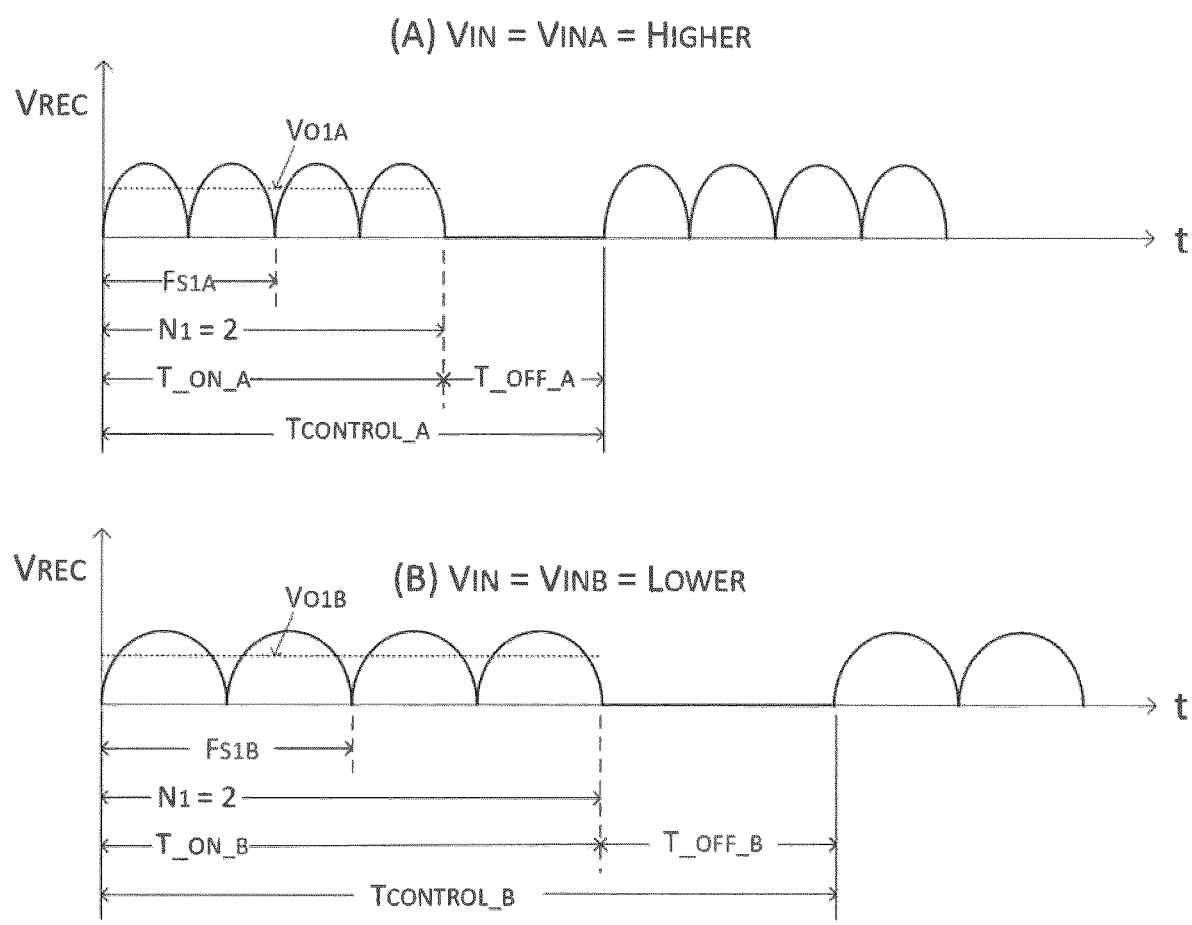
FIGS. 7A and 7B are diagrams showing Fs1 adjustment for different input voltages (A, upper panel) with higher input voltage and higher switching frequency Fs1A; and (B, lower panel) with lower input voltage Vin2<Vin1 and lower switching frequency Fs1B<Fs1A, according to one embodiment.

FIGS. 7A and 7B show typical waveforms of Vrec for two different input voltages, Vin1>Vin2. The switching frequency (Fs1A) for Vin=VinA is higher (FIG. 7A) and the switching frequency (Fs1B) for Vin=Vinb is lower (FIG. 7B). Therefore, the average voltages during the on cycle operation mode for both cases are relatively the same. In order to maintain the same PCR, as defined in equation (2) above, the T off time is shorter for the case of Vin=VinA (T_off=T_off_A) and the T_off time is longer for the case of Vin=VinB (T_off=T_off_B). That is, T_off_A<T_off_B, as shown in FIGS. 7A and 7B.

Practical Consideration During Off Cycle Operation Mode

In the above analysis, it was assumed that during off cycle operation mode, the voltage across Cr, VCr, or equivalently, the rectified voltage Vrec becomes zero immediately after the circuit enters into the off cycle operation mode. In an actual implementation, because of the energy stored in the resonant inductor Lr and resonant capacitor Cr, a small voltage will be present at the beginning of the off cycle operation mode and the actual output voltage will be slightly higher than the value as calculated above. However, because (1) the energy stored in the resonant components is much smaller than the energy stored in the output filter; and (2) the T_off time is used to accurately regulate the output voltage, the small voltage will not impact the operation of the PCM control method. Therefore, in the above analysis and the in the analysis below, it is assumed that no energy is delivered to the output during the off cycle operation mode.

Implementation of Power Cycle Modulation (PCM) Control

This section describes examples of implementations of the control strategies described above. In examples, digital control (e.g., using a MCU) is described. However, the strategies can also be implemented using other digital controllers (e.g., a field programmable gate array (FPGA), etc., as well as with analog circuits.

For example, an MCU may be used, wherein Fs1 may be a linear or nonlinear function of Vin. When Vin increases, Fs1 increases. T_off may be generated by comparing Vo with a reference voltage, Vref, (not shown in FIG. 8) and the error voltage may be subjected to a function such as P (proportional), PI (proportional-integral), or PID (proportional-integral-differential), or other more complex functions. N1 may be generated based on the input voltage and output voltage.

Figure 8:
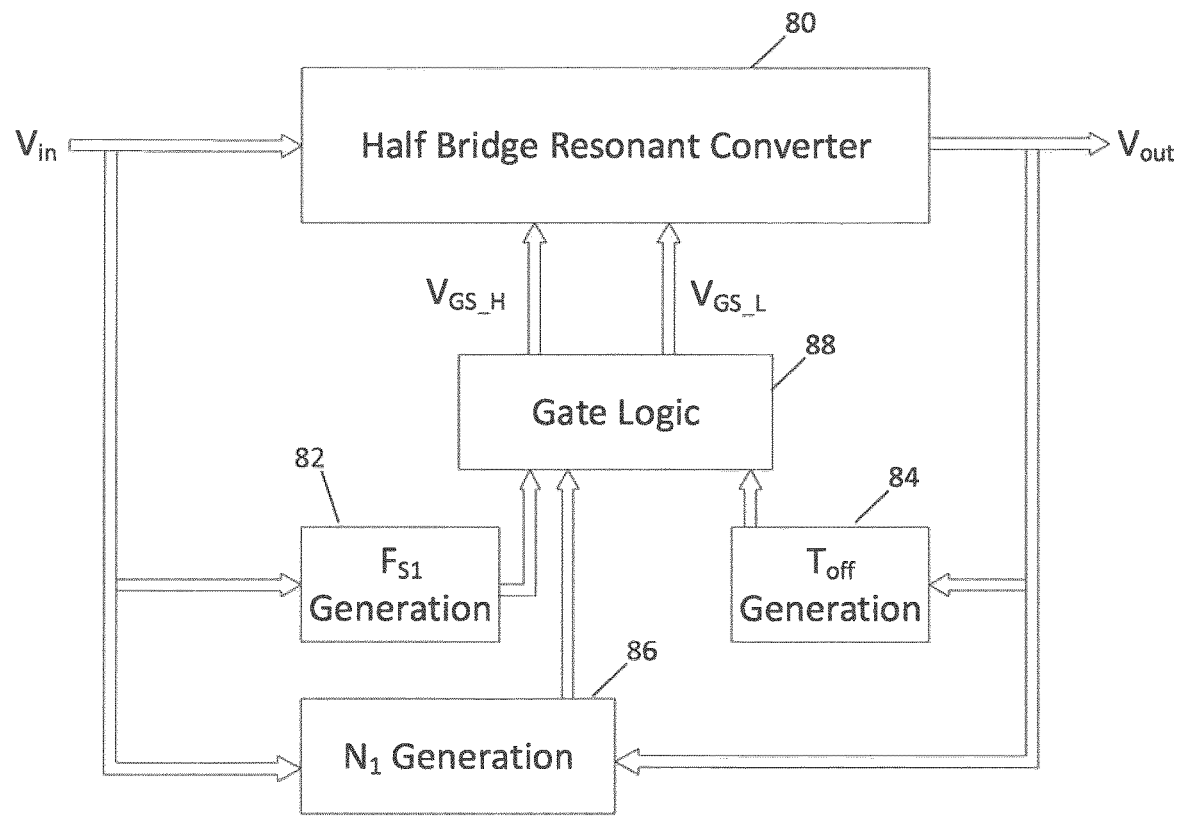
FIG. 8 is a block diagram showing an implementation of a power cycle modulation control method, according to one embodiment.

FIG. 8 shows a general block diagram of a control circuit according to one embodiment used to implement the PCM control strategy shown in FIGS. 7A and 7B. Referring to FIG. 8, the input voltage to the converter 80 Vin is sensed and is used at block 82 to determine the switching frequency Fs1, during the on cycle operation mode. The output voltage Vout is regulated by feedback loop, which is used at 84 to adjust the T_off value, i.e., the time period of the off cycle operation mode. In addition, the number of switching cycles N1 during the on cycle operation mode is determined at 86 using both the input voltage and the output voltage information. Gate logic 88 receives signals corresponding to Fs1, the T_off value, and N1, and produces the required gate driving signals Vgs_h and Vgs_1 for the high side and low side switches (i.e., Q1 and Q2 in FIG. 1A) of the converter 80.

The number of switching cycles N1 during the on cycle operation mode time period is determined based on the required control cycle Tcontrol. It is noted that the output filter of the converter is designed based on the control cycle period Tcontrol. In the example shown in FIGS. 7A and 7B, N1=2 is selected, whereas in FIG. 9, N1=3 is selected. Based on the requirement, any value of N1 can be selected. After N1 is selected, T on=Ts1*N1 can be determined, where Ts1=1/Fs1, the switching period. Then, T_off can be determined based on the required output voltage.

The gate logic block 88 is used to create the gate driving signals sent to the resonant converter. The embodiment of FIG. 8 is for a half-bridge converter; therefore, during on cycle operation mode, the gate signals are complimentary signals with 50% that is used to drive the high side and low side half bridge switches. During off cycle operation mode, the high side gate signal is disabled and the low side gate signal can be high (Q2 on) or low (Q2 off). So no energy is transferred to the resonant tank. Other implementations are of course possible, such as implementations for a full-bridge inverter, as will be readily apparent to those of ordinary skill in the art.

In various embodiments, Fs1 is determined by both Vin and Vout, or T_off is determined by both Vin and Vout, or Fs1 and T_off are determined by both Vin and Vout.

Figure 9:
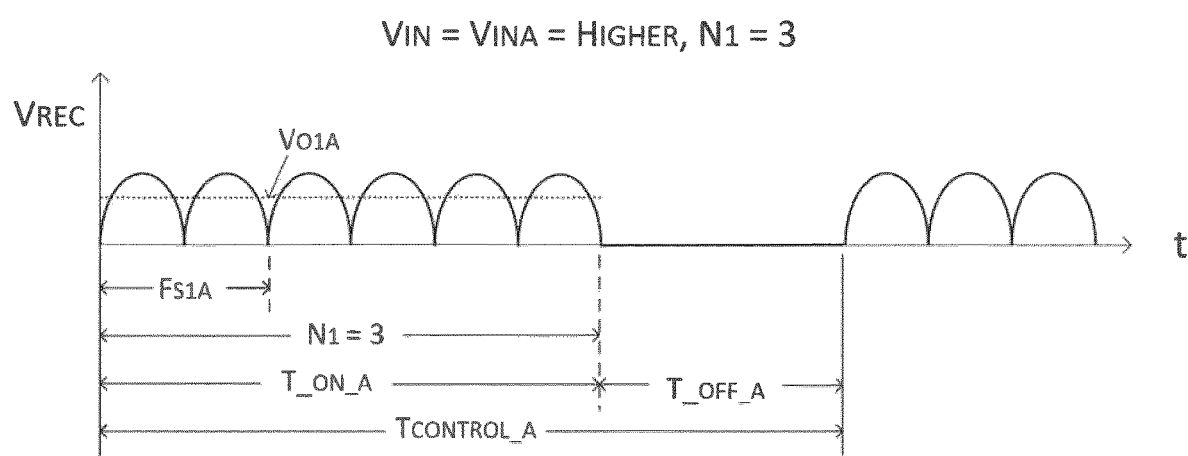
FIG. 9 is a diagram showing three switching cycles during on cycle operation mode (N1=3), according to one embodiment.

The number of switching cycles may be different for different input voltage levels. For example, it is observed from FIGS. 7A and 7B that at higher input voltage, the switching frequency Fs1A is higher than Fs1B, and T_off_A is also shorter than T off B. Therefore, the total control period for higher input voltage Tcontrol_A (FIG. 7A) is shorter than the total control period at lower input voltage Tcontrol_B (FIG. 7B). In order to make the total control period relatively the same under different operating conditions, one method is to increase the number of switching cycles during the on cycle operation mode, or to make N1 larger and the corresponding time of the off cycle operation mode longer. FIG. 9 illustrates such an embodiment. In this case, the number of switching cycles during on cycle operation mode is 3 (N1=3) and the time interval of the off time is also increased accordingly. Since the switching frequency is same, the average voltage of Vrec during on cycle operation mode is still the same.

Example 1

The following example of a PD power adapter as a design demonstrates advantages of the implementation embodiment shown in FIG. 8.

It is assumed that:
(1) The input voltage range is from 200V to 400V.
(2) The output voltage should be adjusted from 20V to 5V. The load current is constant at 3 A.
(3) A parallel resonant converter is used as the power circuit.
(4) The power circuit parameters are selected such that at Vin=200V, Fs=500 kHz and Vrec (average) is 20V. When Vin=300V, Fs=600 kHz and Vrec (average)=20V. When Vin=400V, Fs=700 kHz and Vrec (average)=20V.
(5) The converter is a half-bridge parallel resonant converter (e.g., FIG. 1A), and is ideal and there is no loss.

In this example, the switching frequency Fs1 during on cycle operation mode is controlled by the input voltage and the output voltage Vrec is controlled by a feedback loop which regulates the T_off time period, as shown in the embodiment of FIG. 8.

Case 1: Vo=20V
When Vin is changed from 200V to 400V, the switching frequency Fs1 is changed from 500 kHz to 700 kHz to maintain the average value of Vrec at 20V and then the T off is set to zero. In this case, the output voltage is regulated by switching frequency control. FIGS. 10A, 10B, and 10C illustrate the operation at Vin of 400V, 300V, and 200V, respectively.

Case 2: Vo=15V
If switching frequency control is used, the switching frequency should be increased to above 700 kHz in order to maintain the average value of Vrec is at 15V. With PCM control, the switching frequency can be maintained between 500-700 kHz and 15V output voltage can be achieved by selecting N1=3 and a suitable T_off, as shown in FIG. 11.

In FIG. 11, it is assumed that the input voltage is 400V and therefore, the switching frequency is 700 kHz so that the average voltage of Vrec during on cycle operation mode is 20V. The switching period Ts1 is Ts1=1/700 kHz=1.43 us.

T on=3×1.43=4.29 us. If T off is selected as 1.43 us, the average output voltage will be 15V.

When the input voltage is other values, the switching frequency Fs1 is changed based on the input voltage and the T_off time can be adjusted to keep output voltage at 15V.

This example shows that the input voltage is used to control the switching frequency and the T_off time is used to control the output voltage.

Figure 12:
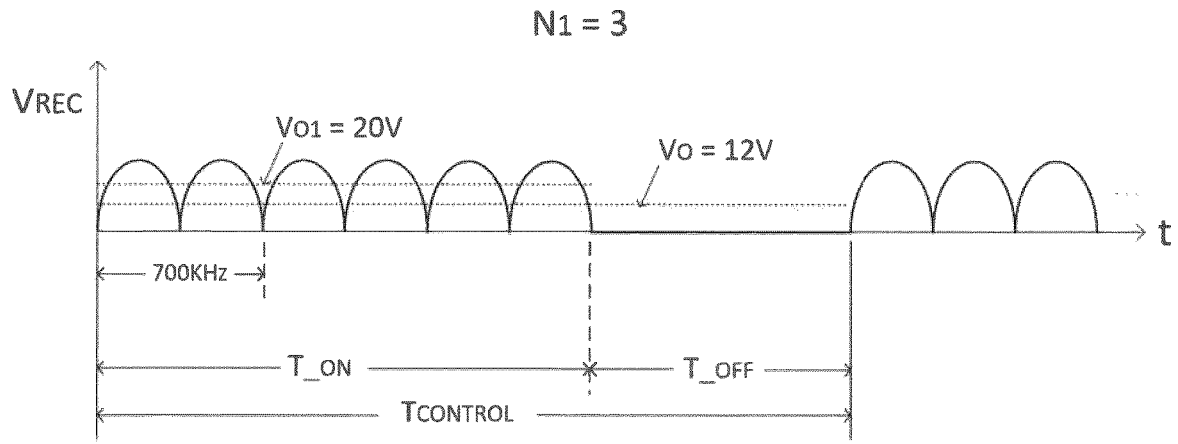
FIG. 12 is a diagram showing a control strategy for an output voltage of 12V with input voltage of 400V, according to one embodiment.

Case 3: Vo=12V
In this case, the switching frequency is controlled by the input voltage through feedforward and the output voltage is controlled by T_off through the feedback loop. FIG. 12 illustrates the operation waveform, assuming Vin=400V, Fs1=700 kHz (Ts1=1.43 us), N1=3, and T_off=2.86 us. During steady state operation, the average output voltage at the output of the converter will be 12V.

When the input voltage is other values, the switching frequency Fs1 is changed and T_off time is also changed to keep output voltage at 12V.

Figure 13:
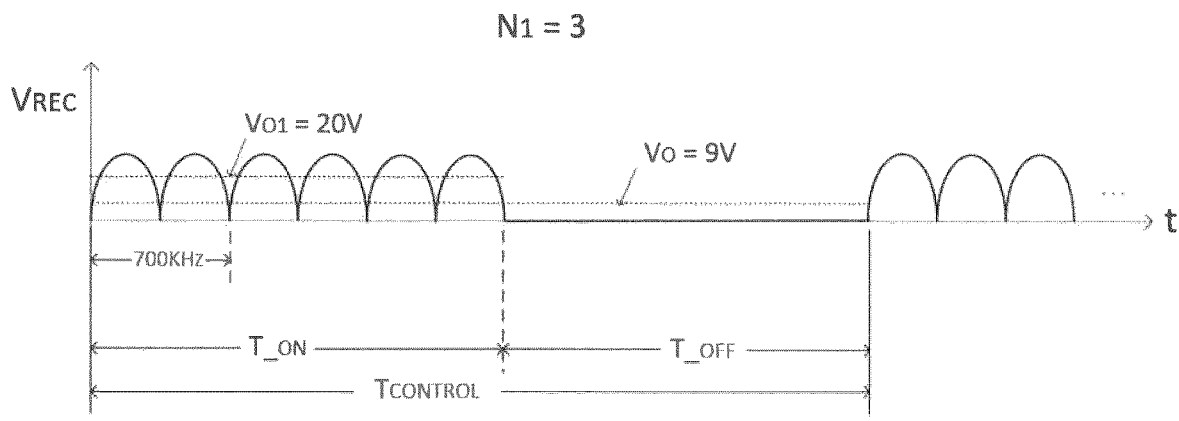
FIG. 13 is a diagram showing a control strategy for an output voltage of 9V with input voltage of 400V, according to one embodiment.

Case 4: Vo=9V
In this case, the switching frequency is controlled by input voltage through feedforward and the output voltage is controlled by T_off through the feedback loop. FIG. 13 illustrates the operation waveform, assuming Vin=400V, Fs1=700 kHz (Ts1=1.43 us), N1=3, and T_off=5.69 us. During steady state operation, the average output voltage at the output of the converter will be 9V.

When the input voltage is other values, the switching frequency Fs1 is changed and T_off time is also changed to keep output voltage at 9V.

Figure 14:
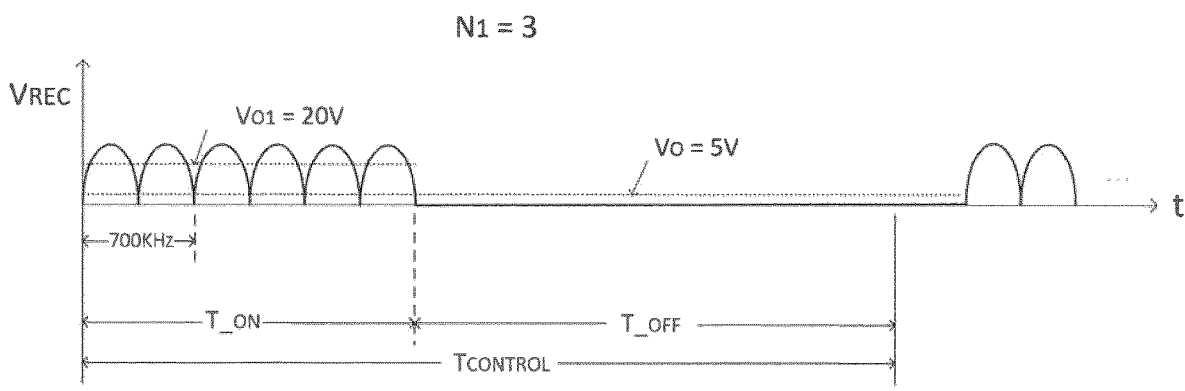
FIG. 14 is a diagram showing a control strategy for an output voltage of 5V with input voltage of 400V, according to one embodiment.

Case 5: Vo=5V
In this case, the switching frequency is controlled by input voltage through feedforward and the output voltage is controlled by T_off through the feedback loop. FIG. 14 illustrates the operation waveform, assuming Vin=400V, Fs1=700 kHz (Ts1=1.43 us), N1=3, and T_off=12.9 us. During steady state operation, the average output voltage at the output of the converter will be 5V.

When the input voltage is other values, the switching frequency Fs1 is changed and T_off time is also changed to keep output voltage at 5V.

This example shows that the switching frequency can be limited to about 500-700 kHz to control the output voltage from 5V to 20V under the input voltage variation between 200-400V. Thus, with limited switching frequency range of 500-700 kHz, the output voltage gain can be changed by 8 times, from highest gain of 0.1 (=20V/200V) to 0.0125 (=5V/400V).

It is noted that the above analysis is approximate. In an actual implementation, the T_off will need to be adjusted by feedback control loop to maintain the output voltage to the desired level. It is also noted that in an actual implementation, the input voltage feedforward control of the switching frequency Fs1 is not very accurate and the average voltage of Vrec during on cycle operation mode might not be maintained at a constant value (such as 20V in our discussion). For example, Vrec may vary from the desired constant value by 5% to 20%, up to as much as 50% in corner cases. However, this error can also be compensated by the feedback control of T_off.

Another control method includes keeping the switching frequency constant at all operating conditions. Then, in this condition, when the input voltage is Vin=200V, the average value of Vrec is be maintained at 20V. For example, if the parameters set forth above are used, the switching frequency will be 500 kHz.

Case 6: Vin=400V. Vo=20V

Figure 15:
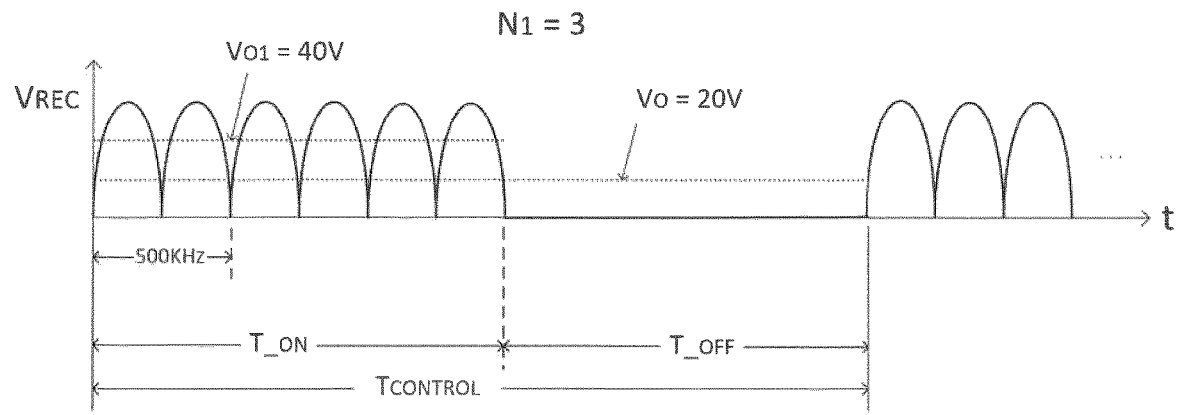
FIG. 15 is a diagram showing a control strategy for an output voltage of 20V with input voltage of 400V, wherein the switching frequency Fs1 is constant, according to one embodiment.

When the input voltage is Vin=400V and the switching frequency is maintained at Fs1=500 kHz, then the average voltage across Vrec during on cycle operation mode will be 40V. In this case, T off time should be introduced to make the output voltage at 20V. FIG. 15 shows the waveform of this operating condition. In this case, the switching frequency is independent of the input voltage and can be set at a desirable value based on the power circuit parameters. The output voltage can be regulated by the off cycle time interval (T_off) and the number of switching cycles (N1) during the on cycle operation mode time period.

Three Control Parameters

From the above description it can be seen that three control variables are available for the closed loop control. These are the number of switching cycles within the on cycle operation mode time interval (N1); the switching frequency (Fs1) during on cycle; and the off cycle operation mode time interval. The following observations can be made:

Observation 1:

The number of switching cycles during the on cycle operation mode time period can be determined based on the control period, Tcontrol. The larger the number, the longer the Tcontrol and therefore, the lower the control frequency Fcontrol, as Fcontrol=1/Tcontrol.

If N1 is changed and T_off does not change, the output voltage of the resonant converter Vo will be different. It is noted that the resonant converter output voltage Vo is a DC voltage. The rectified voltage Vrec has the same DC value as Vo, but it includes the high frequency component. Therefore, T_off should change accordingly when N1 changes.

Observation 2:

It is not critical that the switching frequency Fs1 should be changed very accurately for each input voltage. If Fs1 changes with large steps, such as from 500 kHz, to 505 kHz, to 510 kHz, (i.e., with 5 kHz steps), the output voltage can still be regulated to the desired value by adjusting the T_off value through the feedback loop.

Observation 3:

T_off can be changed with very small time steps, such as 1 ns, or 16 ns, if digital control such as an MCU is used. It is desirable to use T_off to regulate the output voltage accurately to the designed value. In this case, "accurately" means that the output voltage can be adjusted to within 0.1% of the desired value. For 20V output, this means the output voltage can be adjusted to within 0.02V.

Figure 16:
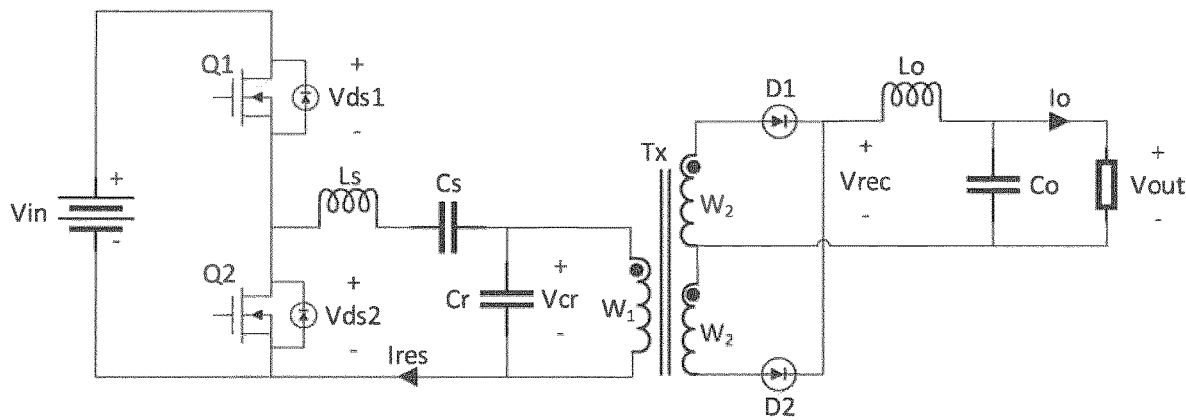
FIG. 16 is a schematic diagram of an LCC resonant converter, according to the prior art.

Observation 4:

The above analysis is based on a half-bridge parallel resonant converter such as that shown in FIG. 1A. The analysis and the PCM control embodiments are also applicable to other types of resonant converters, such as an LCC (inductor-capacitor-capacitor) resonant converter, as shown in FIG. 16. With an LCC converter the analysis and the results are the same.

Practical Consideration

It is noted that the above analysis is based on ideal circuits and ideal conditions. In a practical implementation, the following are possible:
(1) The voltage waveform across the resonant capacitor VCr might not be a pure sinusoidal.
(2) The peak value of VCr at the first switching period during the on cycle operation mode might not reach the peak value until the second or third switching period during the on cycle operation mode.
(3) The resonant tank of the resonant converter might continue to resonate during the off cycle operation mode time period and therefore, a small amount of energy might still be delivered to the output during the off cycle operation mode.
(4) There could be other non-ideal operating conditions.

The consequence of such non-ideal conditions is that the average voltage during the on cycle operation mode will be slightly different from the value derived with ideal case. However, under non-ideal operating conditions, the output voltage can still be maintained at the desired value by adjusting the T_off value through the output voltage feedback loop, e.g., as shown in the embodiment of FIG. 8.

2. Power Cycle Modulation Control of Series Resonant Converter

Figure 17:
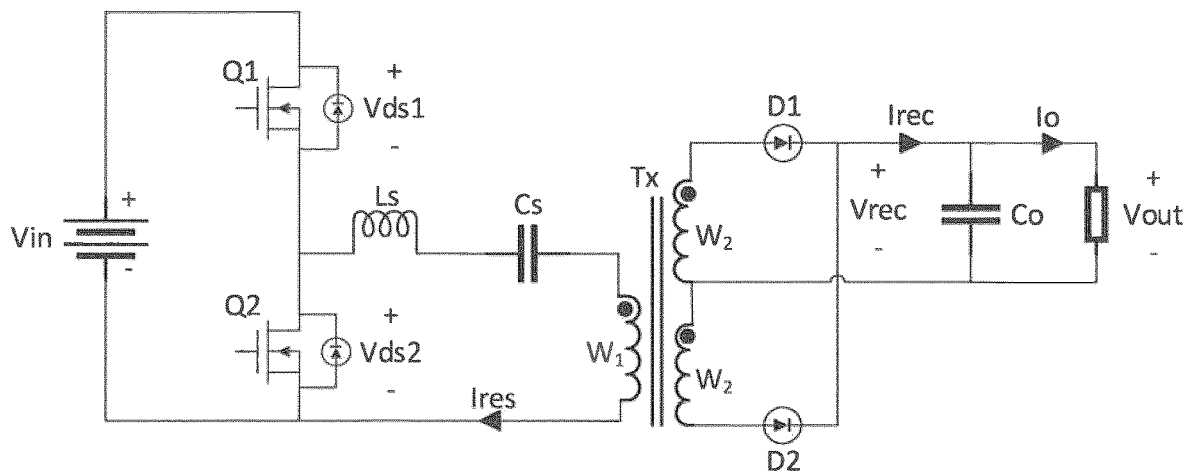
FIG. 17 is a schematic diagram of a series resonant converter, according to the prior art.

Power cycle modulation (PCM) as described above can also be applied to series resonant converters (SRC, FIG. 17). It is noted that for a SRC, the resonant current, Ires, is rectified and fed into the output filter (a capacitor Co). The output of the resonant tank is equivalent to a current source. The rectified current, Irec, feeds the output capacitor and the load. Irec is the rectified current of the resonant current, Ires, as shown in FIG. 17. In the figure, diodes D1, D2 are used to rectify the AC current into DC current as an illustration. Synchronous rectifiers, e.g., using MOSFETs, can also be used.

Figure 18:
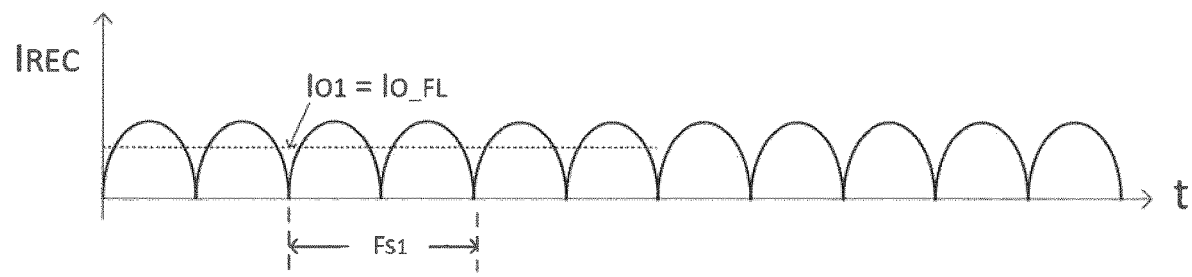
FIG. 18 is a diagram showing full load operation of a series resonant converter under power cycle modulation control, according to one embodiment.

FIG. 18 shows the rectified current waveform, Irec, for an SRC with PCM control under full load condition. In this case, in order to provide the maximum output current, the SRC operates all the time and the time period of the off cycle operation mode, T_off, is zero. In this way, the average value of Irec is the DC full load current, as shown in FIG. 18.

Figure 19:
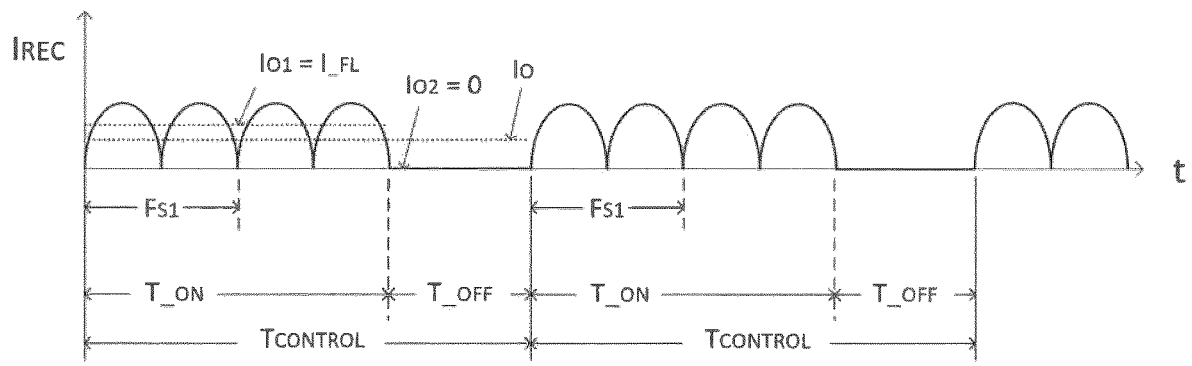
FIG. 19 is a diagram showing operation of a series resonant converter under power cycle modulation control with T_off time adjustment, according to one embodiment.

When the load current is reduced, a conventional way to control the SRC is to increase the switching frequency to reduce the average current of the Irec. However, as described herein, PCM control may be used by introducing the off cycle operation mode, as shown in FIG. 19. Similar to PCM control applied to a PRC as described above, operation of the SRC under PCM control is divided into two operation modes, the on cycle operation mode and the off cycle operation mode. During on cycle operation mode, the SRC operates at switching frequency Fs1 for N1 cycles. For example, N1=2, two switching cycles are illustrated in FIG. 19, for time period of T_on. During off cycle operation mode, the SRC is off for a time period of T_off.

During on cycle operation mode, the average rectified current is Io1. During off cycle operation mode, the Irec is zero. Therefore, the average output current, Io, can be calculated as:

$$Io=Io1*T\_on/(T\_on+T\_off)=Io1*T\_on/Tcontrol \quad (10)$$

Similar to the control method described above, the switching frequency Fs1 may be adjusted based on the input voltage variation. The off cycle operation mode time period, T_off, may be adjusted based on the output voltage/output current variation.

Since the output of the SRC is equivalent to a current source and the power supply is usually to provide a constant voltage, the output current can be adjusted by the changing the T_off time according to equation (10). For example, at full load condition, the output current is high and T_off can be set at zero to provide the maximum current. When the output current is 66%, the T_off time can be adjusted to ⅓ of the T_on value by feedback loop and therefore, the output current will be ⅔ of the full load current, as illustrated in FIG. 19.

Figure 20:
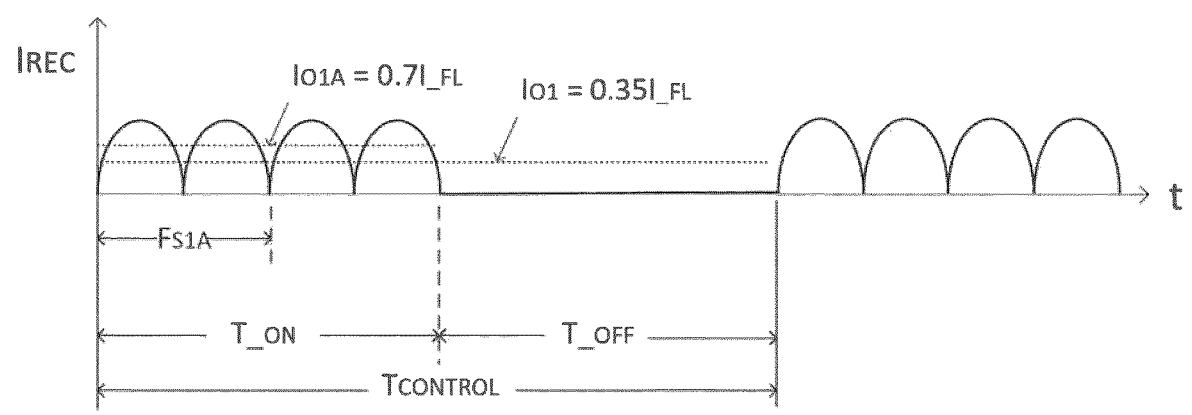
FIG. 20 is a diagram showing setting the average current to peak efficiency during on cycle operation mode of a series resonant converter, according to one embodiment.

One implementation method of PCM for a SRC is as follows:

(1) The switching frequency during on cycle operation mode, Fs1, is controlled by the input voltage.
(2) For full load or close to full load operation (such as, for example, 70% of full load operation), off cycle operation mode is not introduced and the switching frequency is used to regulate the output voltage at different load currents. In consideration with (1) above, the switching frequency Fs1 is regulated to control the output voltage when the input voltage changes and load current changes when load current is at full load or close to full load.
(3) When the load current is lower than the full load current, such as, for example, about 50% to 70% of the full load current, off cycle operation mode is introduced. In this case, the switching frequency Fs1 during on cycle operation mode can be selected so that the average Irec current value during on cycle operation mode is full load current (I_FL), Io1=I_FL as shown in FIG. 19.
(4) A special case of (3) above is that, in general, the maximum efficiency point of a power converter is reached at around 70% full load current condition. Therefore, when the load current is less than 70%, such as 35%, then the switching frequency Fs1 during on cycle operation mode can be selected as Fs1=Fs1A to provide 70% of the load current (Io1a=0.7*I_FL) and then the off cycle time (T_off) can be adjusted to produce the required load current by feedback loop. This operation is desirable to maintain an almost flat efficiency curve over a wide load current range. A relevant waveform is shown in FIG. 20 wherein I_FL indicates full load current. In this case, the switching frequency control is used for input voltage variation and for load current variation between 70-100% of full load. That is, T off is zero in these conditions. When the load current is lower than the peak efficiency current (for example, 70%), PCM modulation is used and the average current value of Irec during on cycle operation mode is set at 70% of the full load current and T_off is introduced to regulate the output current.

It is noted that the above description only provides one possible strategy for implementing the Power Cycle Modulation control strategy. One of the benefits of PCM control is that the output voltage or output current can be changed over a wide range while the switching frequency variation range is small. Therefore, the switching frequency (Fs1) during on cycle operation mode can be selected to meet a specific design requirement.

The control circuit block diagram of FIG. 8 can also be used for SRC to achieve PCM control. A difference is that if the average output current generated from PCM control is higher than the load current of an SRC, the output voltage will increase and then the T_off time will also increase to reduce the average output current and therefore, to reduce the output voltage such that the output voltage is regulated to its desired value.

Extension to Large Output Voltage Variation Range

As discussed above, in PD applications the output voltage will need to change from 5V to 20V (i.e., a very wide range) to suit a range of devices, and in addition the input voltage may vary (such as from 120V to 220V). When an SRC is used in the design of a PD controller, the resonant current will depend on both the input voltage and the output voltage.

For example, the reflected voltage at the transformer primary side winding (W1 in FIG. 17) will be different for 20V output and for 5V output (i.e., four times different). That is, the reflected voltage for Vo=20V is four times for the case of Vo=5V. Therefore, the switching frequency during on cycle operating mode should be changed based on both Vin and Vo.

Figure 21A:
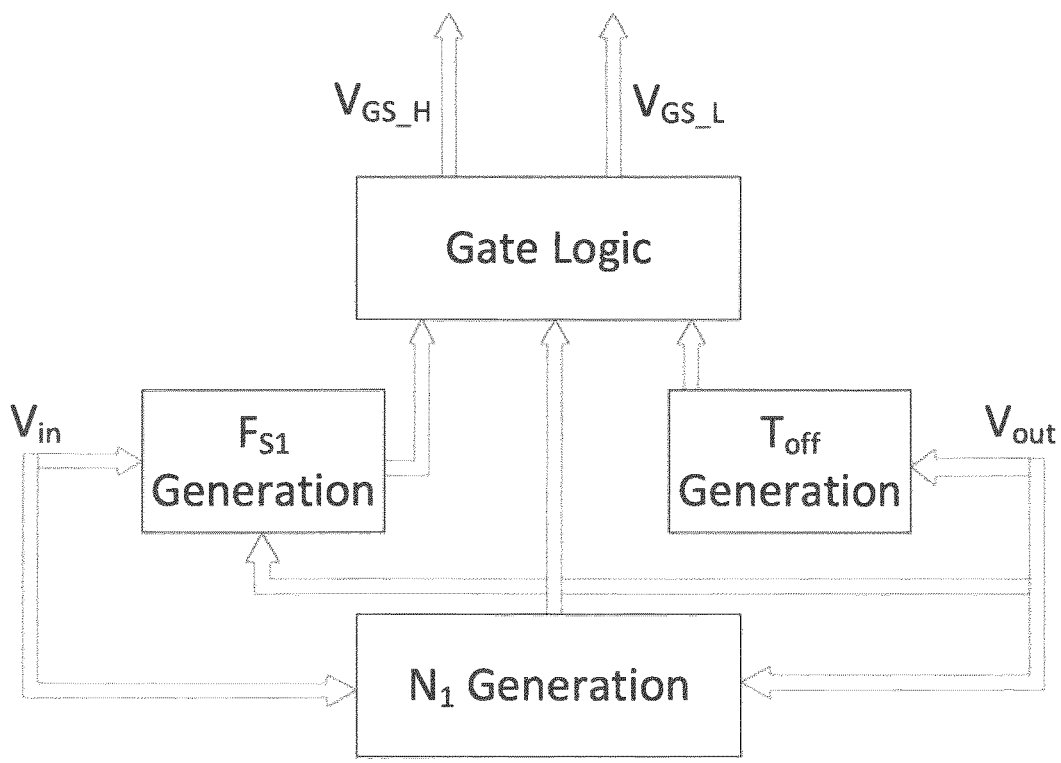
FIGS. 21A-21E are block diagrams of power cycle modulation control circuits, according to various embodiments.

A control strategy may include feedforward and/or feedback control loops, as shown in the embodiments of FIGS. 21A-21E. FIG. 21A shows a control circuit block diagram according to one embodiment with three control loops. One loop is an Fs1 generation loop for Fs1 determined based on the input voltage and output voltage. One implementation of this loop is to use Vin as a feedforward to select the value of Fs1 and then use Vo to further adjust the actual Fs1. For example, if based on the Vin value, a switching frequency may be 500 kHz. If in this case the output voltage is 5V, the actual switching frequency will be increased by some percentage value, such as, e.g., 40%, to reduce the resonant current. It is noted that when the output voltage is lower, the reflected voltage at the transformer primary side winding (W1) is also lower and the resonant current is higher. In order to limit the resonant current, the switching frequency is increased.

Figure 22:
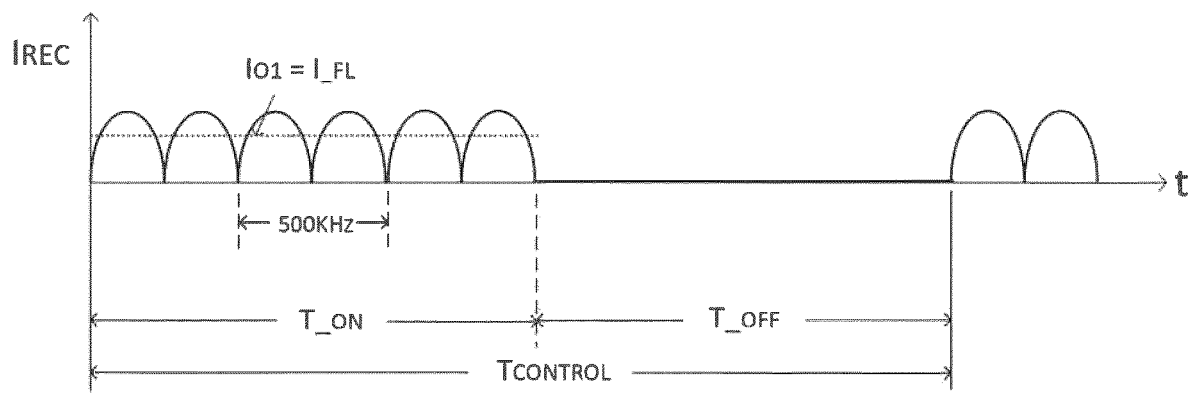
FIG. 22 is a diagram showing output current of a series resonant converter under power cycle modulation control with operating conditions of Vin=200V, Vo=20V, 50% of full load, according to one embodiment.
Figure 23:
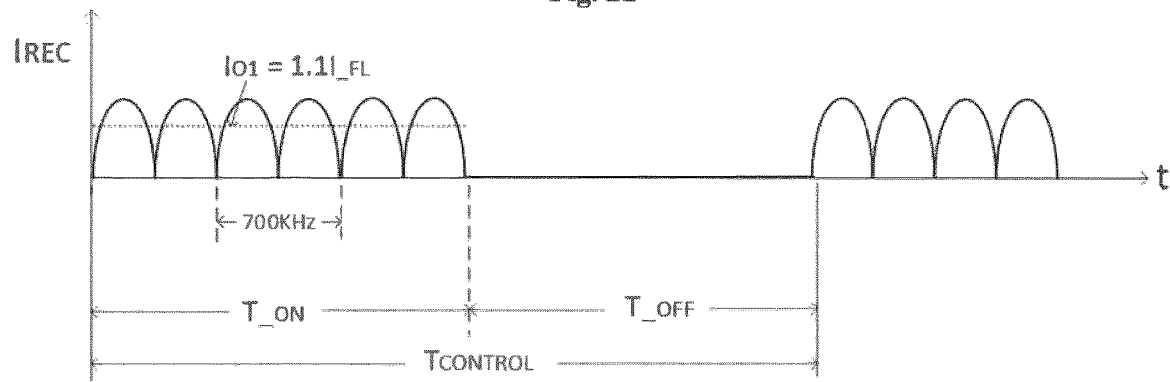
FIG. 23 is a diagram showing output current of a series resonant converter under power cycle modulation control with operating conditions of Vin=200V, Vo=5V, 50% of full load, wherein a higher switching frequency is used to limit the resonant current, according to one embodiment.

FIG. 22 and FIG. 23 show two different operating conditions to illustrate the above control strategy. The operating condition for FIG. 22 is Vin=200V and Vo=20V, and the operating condition for FIG. 23 is Vin=200V and Vo=5V. In both conditions, the load current is at 50% of the full load.

In FIG. 22, it is assumed that during on cycle operation mode, the switching frequency is 500 kHz and the average current Irec during on cycle operation mode is the full load current (I_FL). In this case, the required T_off is same as the T on.

When the output voltage is 5V, the reflected voltage across transformer primary side winding (W1) is lower and the resonant current will be higher if the switching frequency is maintained at 500 kHz. In order to limit the resonant current, it is assumed that (1) the switching frequency is increased to 700 kHz (for example), and (2) the average current Irec (during on cycle operation mode) is 1.1 times the full load current. Then, the T_off is regulated to be around 1.2 times T on, i.e., T off=1.2*T on to maintain the output current at half the full load. In both cases, the number of switching cycles during on cycle operation mode is still 3, N1=3. It is noted that with N1=3, the number of half cycles is 3×2=6, as shown in FIG. 22.

The second loop is the N1 generation loop. This can be determined by the input voltage and output voltage. The selection method is similar to the control block diagram as shown in FIG. 8.

The third loop is the feedback loop which is used to adjust the T_off time to regulate the output voltage.

All three loops work together to generate the desired Power Cycle Ratio (PCR) as defined by equation (2.1) to maintain the output voltage at the required value.

Figure 21B:
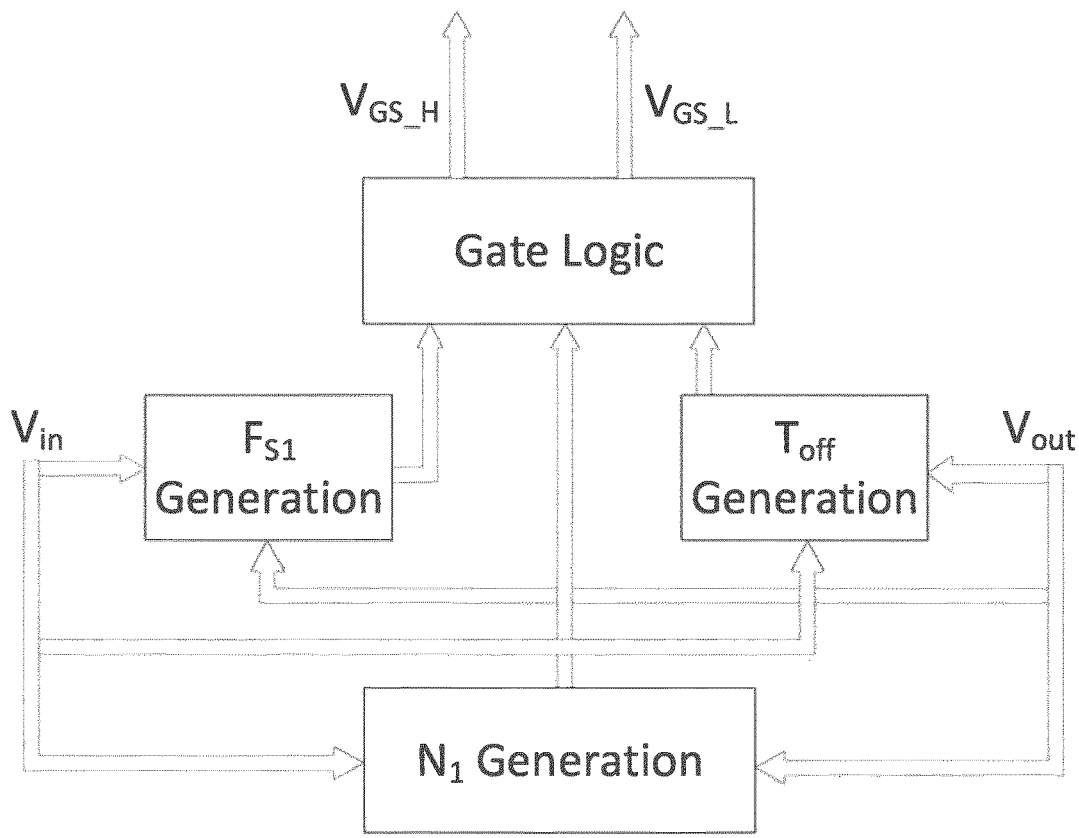
Figure 21C:
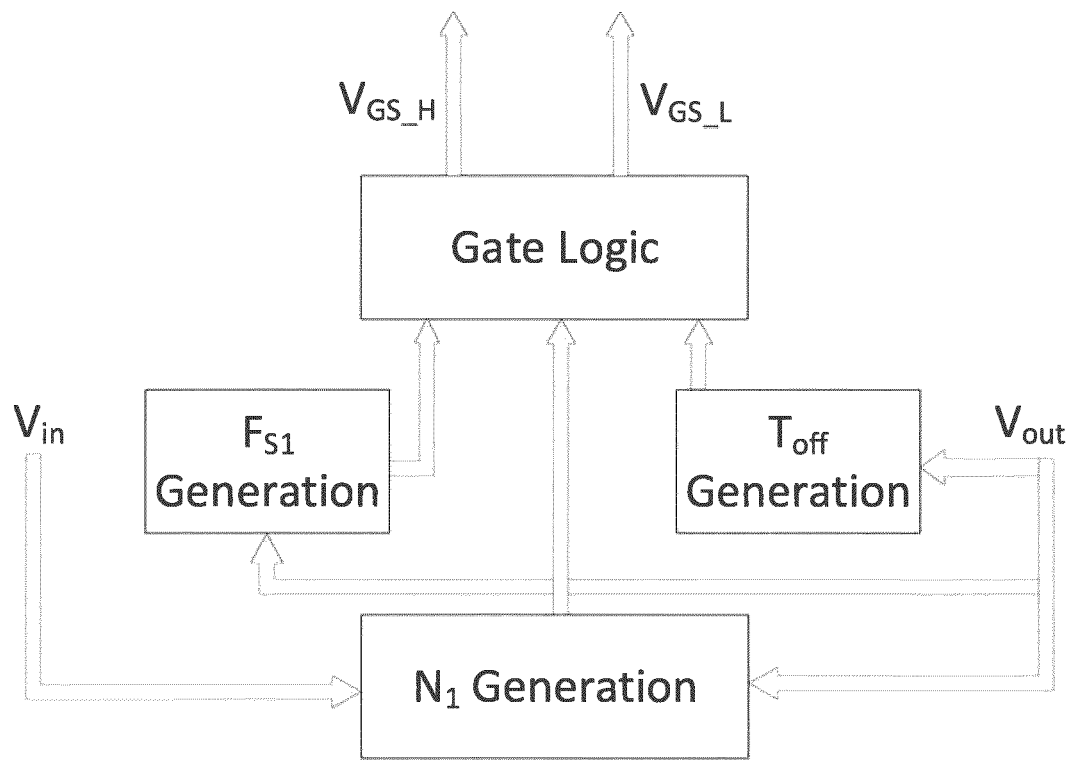
Figure 21D:
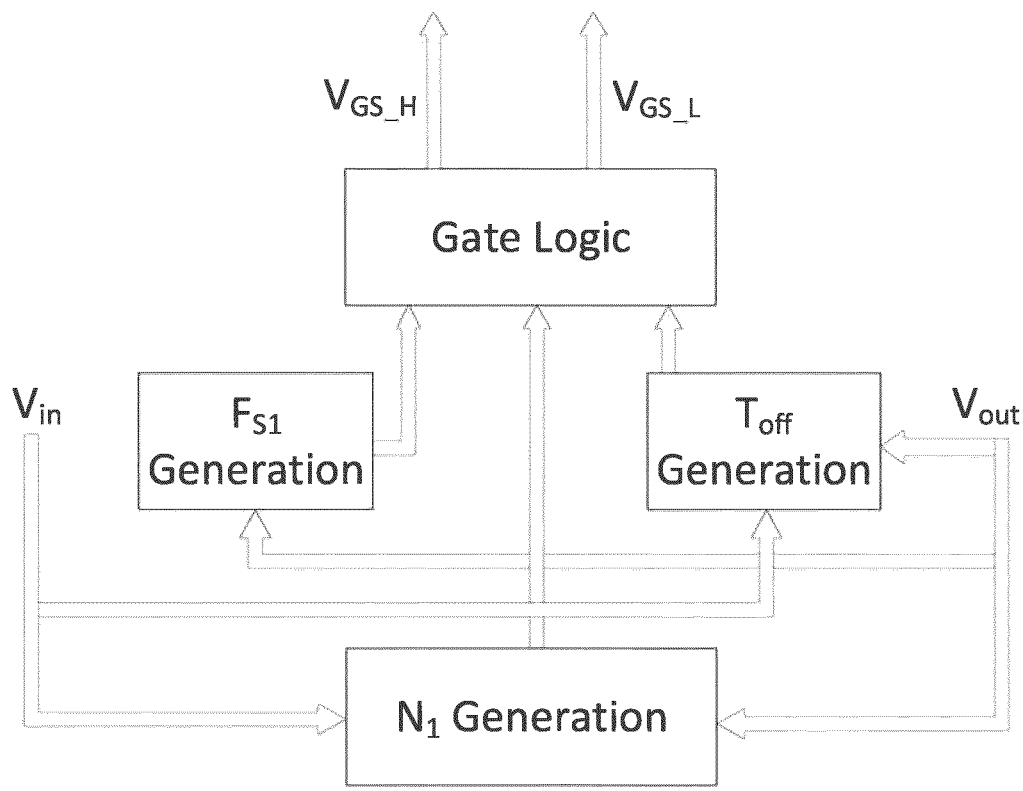
Figure 21E:
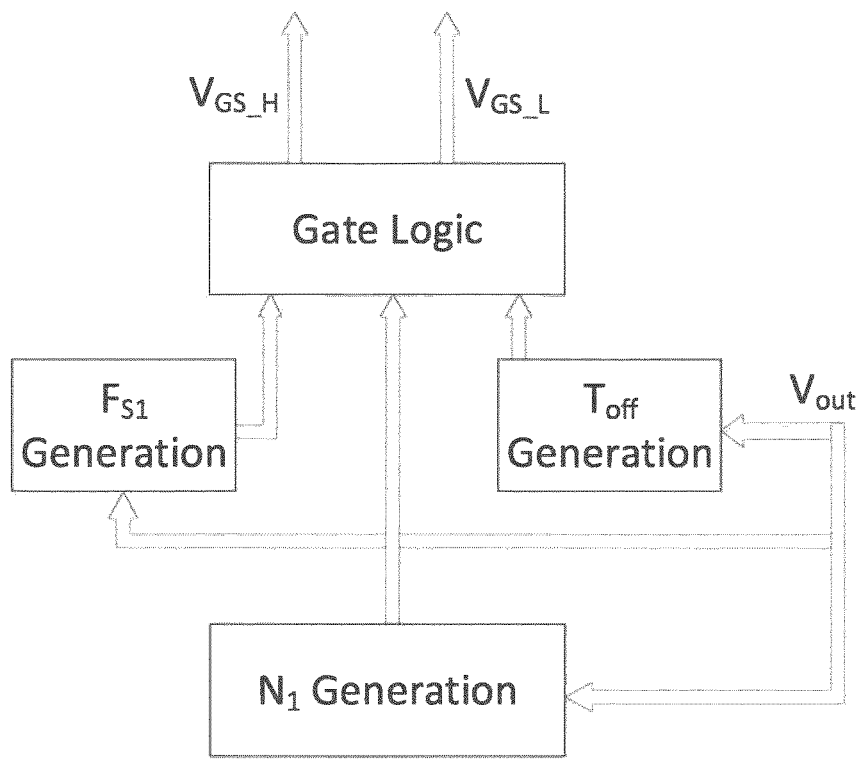

FIGS. 21B-21C are block diagrams of control strategies according to other embodiments. In the embodiment of FIG. 21B, the input voltage and the output voltage are used to select the switching frequency Fs1, the T_off time, and N1. In the embodiment of FIG. 21C, the input voltage and the output voltage are used to select N1, and output voltage is used to select the switching frequency Fs1 and the T_off time. In the embodiment of FIG. 21D, the input voltage and the output voltage are used to select the T_off time and N1, and the output voltage is used to select the switching frequency Fs1. In the embodiment of FIG. 21E, the output voltage is used to select the T_off time, N1, and the switching frequency Fs1.

Extension to LLC Resonant Converter

Figure 24:
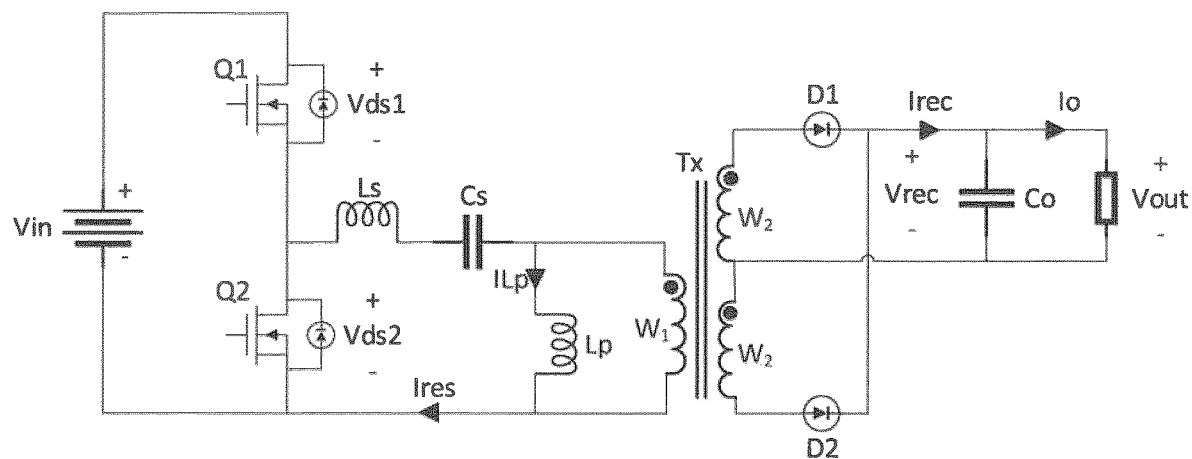
FIG. 24 is a schematic diagram of an LLC resonant converter, according to the prior art.
Figure 25:
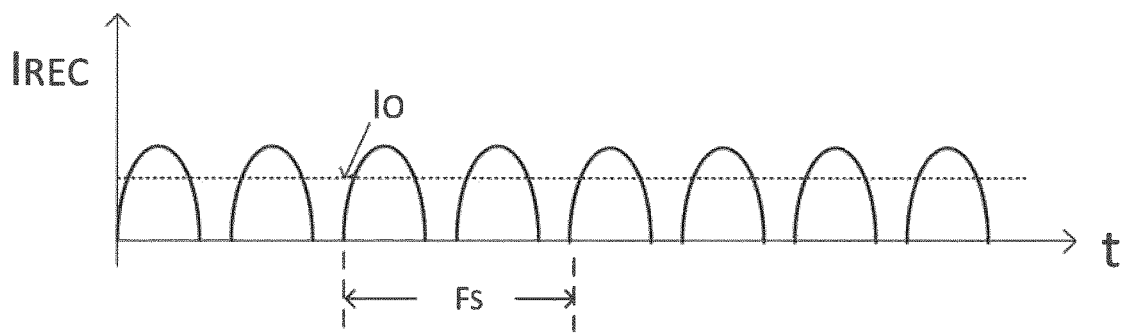
FIG. 25 is a diagram showing full load operation of an LLC resonant converter under power cycle modulation control, according to one embodiment.

An LLC (inductor-inductor-capacitor) resonant converter (e.g., as shown in FIG. 24) is a popular converter that is widely used. The LLC converter uses a parallel resonant inductor, Lp. Therefore, the primary side current of the transformer is the difference between the resonant current and the Lp current and rectified current Irec is not continuous as shown in FIG. 25. It is observed from FIG. 25 that there is a short dead time for the rectified current Irec of an LLC converter. During this dead time, the primary side resonant current is same as the current through the parallel resonant inductor and therefore, the transformer primary side current is zero. Consequently, the rectified current at the secondary side (Irec) is also zero.

Figure 26:
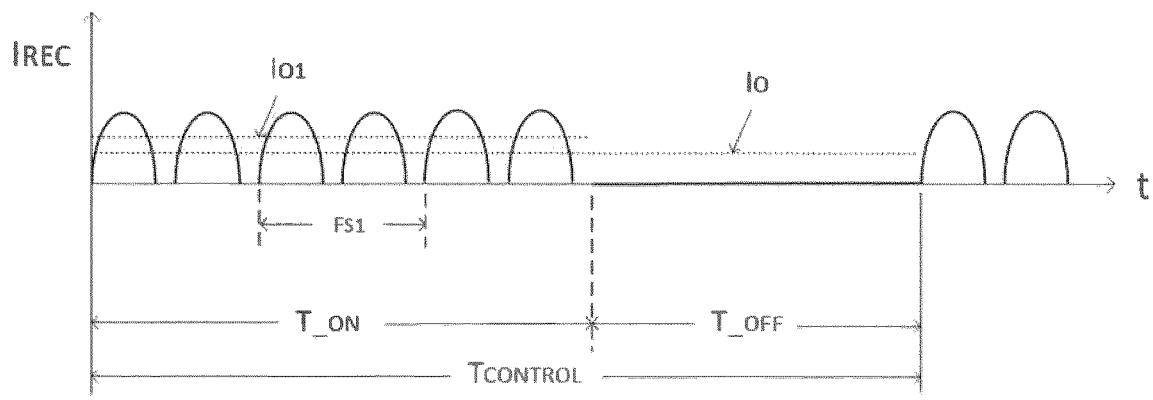
FIG. 26 is a diagram showing output current of an LLC resonant converter under power cycle modulation control, with T_off time adjustment, according to one embodiment.

Power cycle modulation with T_off time adjustment can also be applied to an LLC converter, for example, as shown in FIG. 26.

In FIG. 26, during on cycle operation mode, the LLC converter will deliver average output current of Io1. During off cycle operation mode, no current is delivered. Therefore, the average output current can be calculated as:

$$Io=Io1*T\_on/Tcontrol=Io1*T on/Tcontrol=Io1*PCR \quad (11)$$

This is same as the case for a series resonant converter.

Summary of Power Cycle Modulation

Based on the above analyses, it can be summarized that with a PCM control method as described herein, the output voltage of a converter can be regulated by three parameters. The first parameter is the number of switching cycles N1 when the converter is in on cycle operation mode. The second parameter is the switching frequency Fs1 when the converter operates in on cycle operation mode. The third parameter is the T_off time when the converter is in off cycle operation mode. T_off may be zero under certain conditions. The output voltage can be adjusted by Fs1 or by T_off or by both Fs1 and T_off.

PCM control method embodiments can be applied to PRC and LCC resonant converters where the output of the resonant tank is equivalent to a voltage source, and to SRC and LLC resonant converters where the output of the resonant tank is equivalent to a current source.

According to the embodiments, the converter output voltage can be regulated over a wide output voltage range (such as 4:1 ratio) and over a wide input voltage variation range (such as 2:1) while the switching frequency variation is relatively small, such as 1.5:1 (or 50% change, such as from 500 kHz to 750 kHz).

Example 2. Simulation

The following example shows simulation results based on PCM implemented in a parallel resonant converter. For the simulation, PSIM™ v. 12 (Powersim Inc., Rockville, Md., USA) was used. In the simulation, during T_off, Q1 of the parallel resonant converter is off and Q2 is on. The circuit parameters are listed below:

TABLE 4

Circuit parameters used in the simulation.

| | |
|---|---|
| Input voltage of PRC: Vin | 200 V |
| Lr | 33 μH |
| Cr | 0.8 nF |
| Transformer turns ratio: N | 8:1 |
| Lo | 5 μH |
| Co | 20 μF |
| Io | 3 A |
| Output voltage Vo_min | 5 V |
| Output voltage Vo_max | 20 V |

Simulation Results by Fs1 Adjustment

Figure 27:
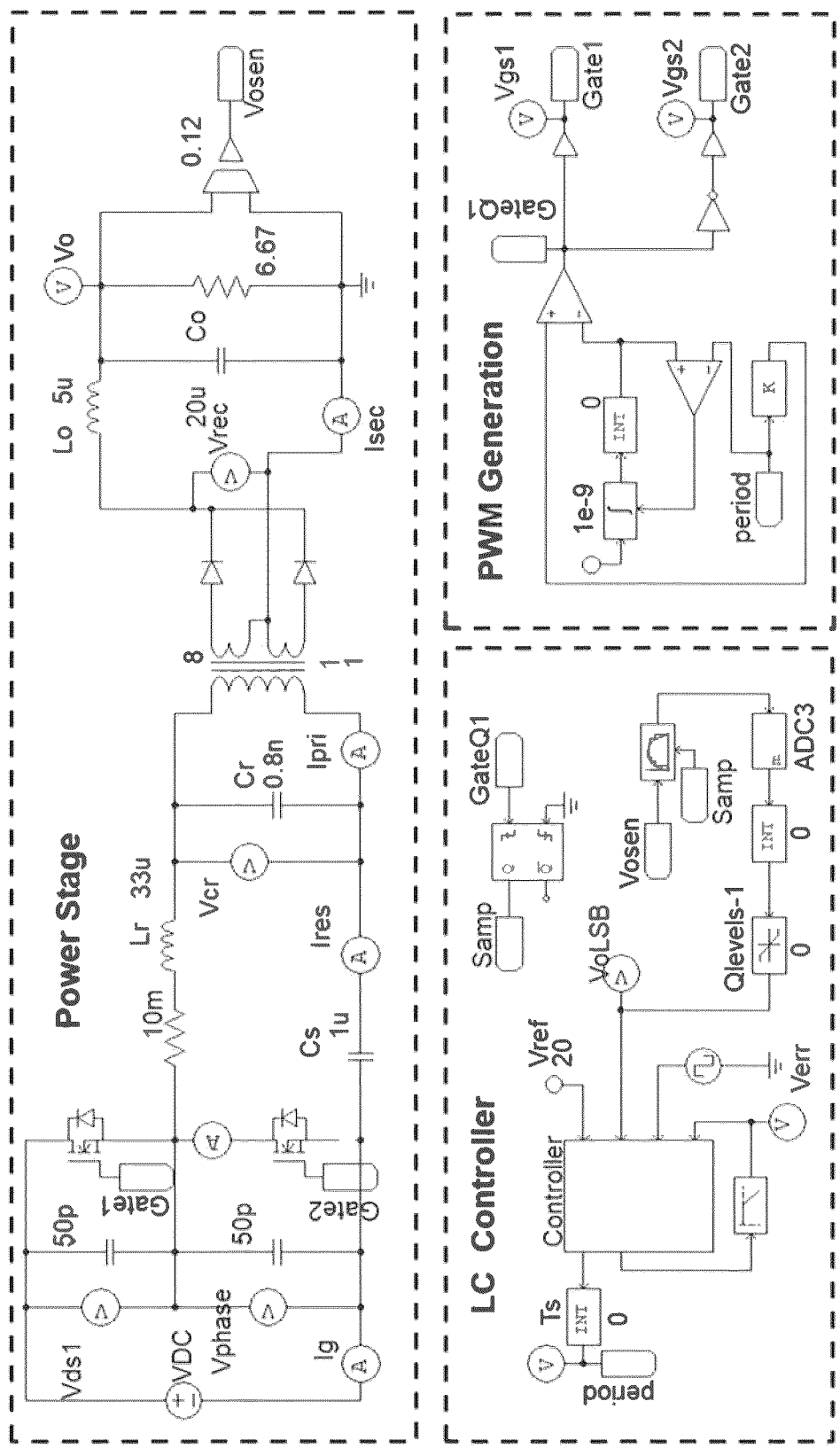
FIG. 27 is a circuit diagram of a power cycle modulation implementation with a parallel resonant converter, obtained using PSIM simulation software.
Figure 28:
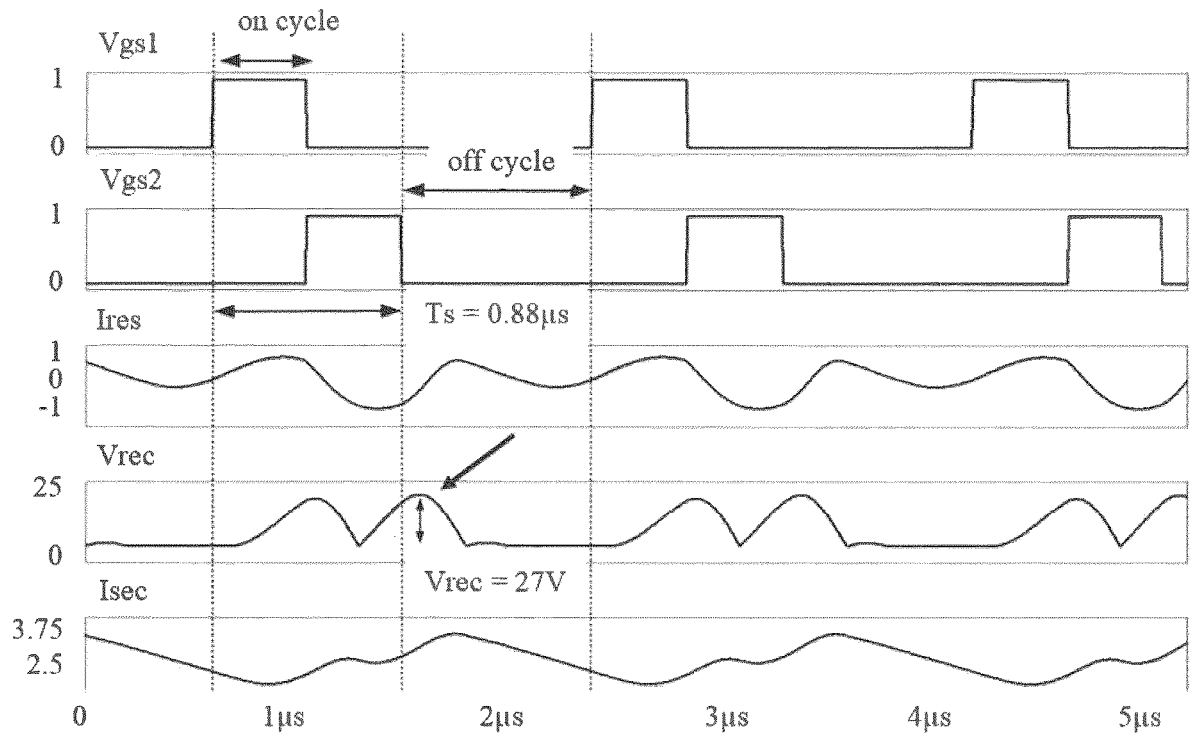
FIG. 28 is a plot showing key waveforms of power cycle modulation control to generate 9V output, for the simulation of FIG. 27.

The simulation model generated by the PSM simulation software is shown in FIG. 27. FIG. 28 shows the simulation result when the output voltage was regulated at 9V. The waveforms are, from top to bottom, gate voltage of Q1, gate voltage of Q2, resonant current Ires, rectified voltage Vrec, and the output filter inductor current Isec. In this case, N1=1 and N2=1 (T_off=0.88 us). Fs1=1/0.88 us=1.14 MHz. It is observed that at the starting period of the off cycle operation mode, Vrec is not zero and during this short period of time, the energy stored in Cr is transferred to the load.

When the output voltage is high, such as 20V, T off can be set as zero. This condition may be referred to as non-PCM operation. The output voltage is regulated by switching frequency variation. In this case, full power with 20V at 3A load current is regulated and the frequency is selected to be about 1 MHz. Vgs1 is the gate signal of Q1 and Vgs2 is the gate signal of Q2, while Ires is the resonant inductor current. A zero voltage switching condition can be achieved by the parallel resonant converter. The waveform of the resonant capacitor voltage and rectifier current shows the power delivery. When the required output voltage is close to 20V, the duty of both Vgs1 and Vgs2 are fixed at 50% and the converter uses variable switching frequency control to control the output voltage so that peak efficiency condition can be achieved. This operation mode is similar with full power condition to conventional control of a resonant converter, i.e., switching frequency control. In other words, the output voltage is controlled by varying the switching frequency when the required output voltage is close to the high end of the output voltage range. In this example, the output voltage range is from 5V to 20V. The switching frequency control is used to regulate the output voltage when the required output voltage is close to 20V.

Power Cycle Modulation (PCM) Operation

When the required output voltage is lower, such as Vo=15V, the required switching frequency will be too high and the converter operation will not be optimized. PCM is used to control operation of the converter. In PCM operating mode, the Power Cycle Ratio (PCR), as defined by equations (2) and (2.1), is controlled to regulate the output voltage, or the output voltage is controlled by T_off time period for a fixed number of switching cycles during on cycle operation mode. In the simulation, during the off cycle operation mode, both Q1 and Q2 are off and the converter does not take any power from the input source as Q1 is turned off; while in the on cycle operation mode, the MOSFETs operate at about 1 MHz frequency and also at 50% fixed duty cycle and energy is transferred to the load side. It is noted that in PCM control, the output voltage is controlled by two control parameters: the PCR and switching frequency Fs1 during on cycle operation mode. T_off value can be used to change the PCR.

With PCM control, the controller selects a specific number of switching cycles for the on cycle operation mode N1 and off cycle operation mode N2 (or equivalently T_off) based on the input voltage and required output voltage levels. Then it counts and generates the specific numbers of control signals for the on cycle operation mode (for N1 switching cycles) and off cycle operation mode (for N2 switching cycles, or T_off time period). FIG. 28 shows the key waveforms of PCM control with 9V output. In this example, the ratio of the on cycle operation mode and off cycle operation mode is selected as 1:1 (N1=1, N2=1). The interval from the time when Q1 is first turned on to the time when Q2 is turned off from the last continuous switching cycle is the on cycle operation mode time period. The interval from the time when the on cycle operation mode is finished to the time when Q1 is turned on again is the off cycle operation mode time period, T_off. The total number of switching cycles in on cycle operation mode is N1 and the total number of switching cycles in off cycle operation mode is N2. In the example as shown in FIG. 28, N1 is 1 and N2 is 1. Fs1=1/0.88 us=1.14 MHz.

It is noted in FIG. 28 that the power is taken from the input source during on cycle operation mode. During the transition from on cycle operation to off cycle operation, the rectified voltage, Vrec, reduces to zero when the energy stored in the resonant capacitor is transferred to the output. The resonant current becomes substantially zero (i.e., very small value). The output voltage is maintained at 9V by adjusting the T_off time. In this case, the output filter current ripple is 1.6 A peak-peak.

Figure 29:
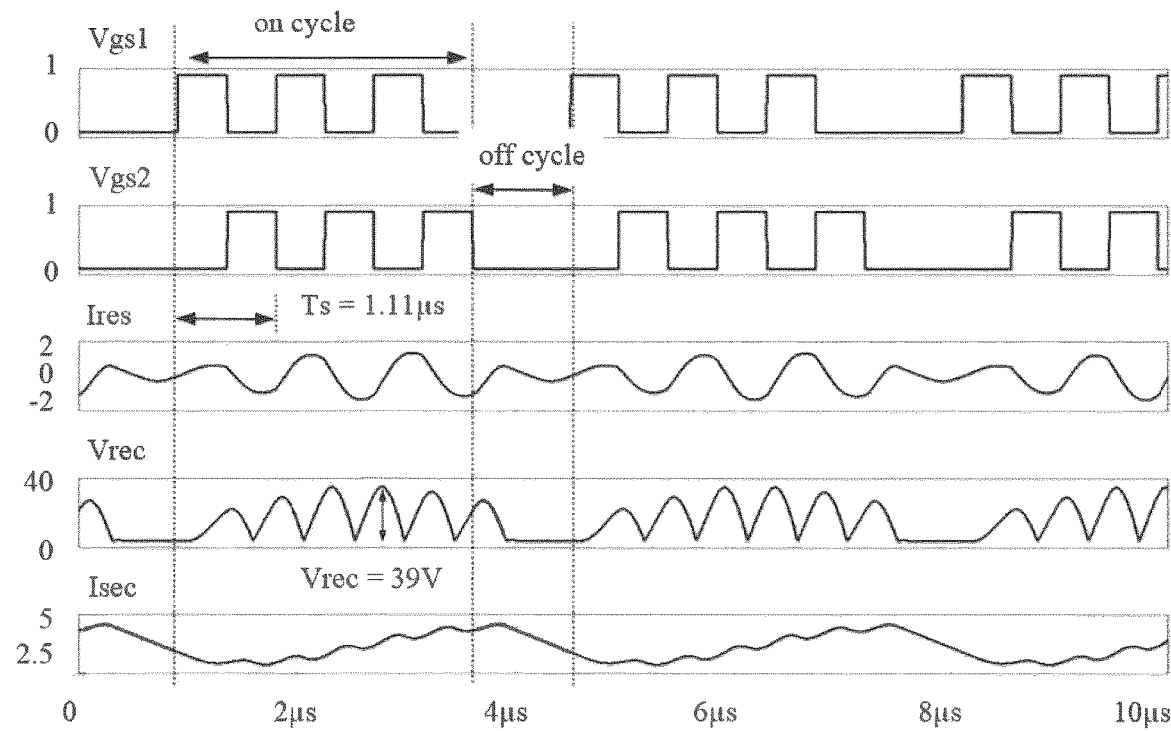
FIG. 29 is a plot showing key waveforms of power cycle modulation control to generate 15V output, for the simulation of FIG. 27.

When the required output voltage is 15V, N1=3, N2=1 are selected. FIG. 29 shows the simulated waveforms with 15V rated output voltage. It can be observed that higher power is delivered during on cycle operation mode. T_off time is shorter. The output filter current ripple is 2.6 A peak-peak. In this case, N1=3 and N2=3 (T_off=1.11 us). Fs1=1/1.11 us=900 KHz.

Figure 30:
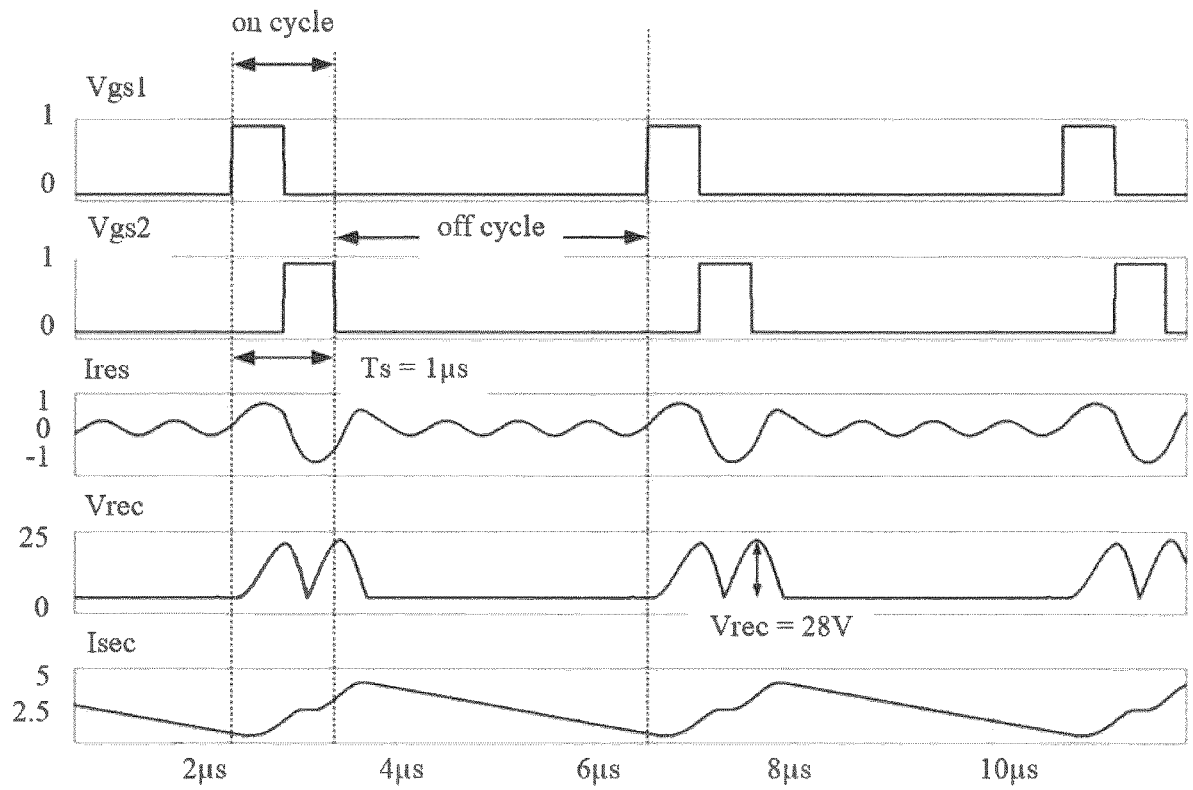
FIG. 30 is a plot showing key waveforms of power cycle modulation control to generate 5V output, for the simulation of FIG. 27.

When the required output voltage is 5V, N1=1, N2=3 are selected. FIG. 30 shows the simulated waveforms with 5V rated output voltage, according to the resonant current waveform, it will reach a steady state resonance after a short transient process. The output filter current ripple is 5 A peak-peak. According to the waveforms of these three operation modes, it can be verified that a LC output filter with reasonably low value is able to guarantee continuous filter inductor current. FIG. 30 shows the simulation result when the output voltage is regulated at 5V. In this case, N1=1 and N2=3 (T_off=3 us). Fs1=1/1 us=1 MHz.

From the above simulation results, it is demonstrated that when the switching frequency changes between 900 KHz and 1.14 MHz, the output voltage can be regulated from 5V to 20V.

If the required output voltage is another value between these values, a suitable N1 and N2 (T_off) can be selected based on the design parameters and then the exact output voltage can be achieved by changing Fs1 and T_off.

It is noted that in the above description of PCM control, it is assumed that Fs1 can be changed continuously while N1 and N2 are discrete values. The output voltage can be controlled continuously.

Digital Controller Implementation of PCM Using Parallel Resonant Converter for a PD Application If PCM control method is implemented by a microcontroller unit (MCU), or other digital circuit, the frequency Fs1 is generated by the MCU and it cannot be changed continuously. In this case, the time interval of the off cycle time T_off can be changed to regulate the output voltage. Then, the output voltage can be changed continuously. If the clock frequency of an MCU is 100 MHz, the T off resolution can be 10 ns, which will ensure very high output voltage resolution, since the switching frequency is in the 1 MHz range.

PCM control may be used to control a conventional parallel resonant converter. In one embodiment, two operating conditions may be employed: the non-PCM condition and the PCM condition. Non-PCM condition changes the switching frequency to regulate the output voltage (in this case, N2=0, or T_off=0), which is same as the conventional control strategy for a resonant converter. This condition is used when the output voltage is close to the highest value, such as from 17V to 20V (e.g., in the case of power delivery design, such as 5V to 20V). The PCM condition is used to regulate the output voltage when the switching frequency variation range would be too wide in order to regulate the output voltage at non-PCM condition. In the case of a PD design, it is between 5V to 20V. Under PCM condition, the resonant converter operates between on cycle operation mode (also referred to as loaded operation mode), which operates at the peak efficiency point, and off cycle operation mode (also referred to as non-loading operation mode, with no energy taken from the input source). The average power is balanced by the output LC filter.

In the following section, detailed operation of these two modes will be explained. Waveforms and operations will be described based on the parameter designs as shown in Table 4. In this example, the output voltage is regulated from 5V to 20V. Examples of Vo=5V, 9V, 15V and 20V are used in the following description. Other output voltage levels can also be achieved using the same PCM control method.

With PCM control, two major advantages are achieved:
(1) The output voltage can be regulated over a wide range.
(2) The efficiency over the wide output voltage range will be maintained close to the peak efficiency since the circuit will operate either at peak efficiency during on cycle operation mode or no loss during off cycle operation mode.

Another advantage of the PCM control method embodiments is that the adapter is able to operate at different power levels from only using 20V as the loaded voltage level. In this way, power level with peak efficiency can be used for the on cycle operation mode and therefore better performance can be achieved. In such a design, with the same load current, peak efficiency occurs at 20V output voltage, and this operation can be selected as the loaded operation (on cycle operation mode). For a design in which the peak efficiency occurs between 5V to 15V, say 12V for instance, the converter will switch between the 12V/3 A operation (on cycle operation mode) and off cycle operation mode to regulate the output voltage of 5V, 9V and other voltage levels below 12V. Between 12V and 20V varying Fs1 control is employed for output regulation. As a consequence, the peak efficiency operation is achieved in most of the operating conditions, thus providing overall high efficiency.

Transition Between on Cycle Operation Mode and Off Cycle Operation Mode

As mentioned in the previous section, there is a transition period between the on cycle operation mode and off cycle operation because of the change of operating condition (i.e., with input energy versus without input energy). During this transition period, the energy stored in the resonant inductor and capacitor will be transferred either to the input source or to the load, or both. This transition is not desirable from the control point of view and it results in an energy feedback problem. In an actual circuit implementation, the current and voltage of the LC resonant tank will resonate during the off cycle operation mode. Thus the upper MOSFET Q1 may lose zero voltage turn on for the first cycle in the next on cycle operation mode. This will introduce additional losses and reduce the overall efficiency. This section provides a detailed implementation of the modulation methods to solve these two problems.

Extended On-Time for Energy Feedback

Figure 31:
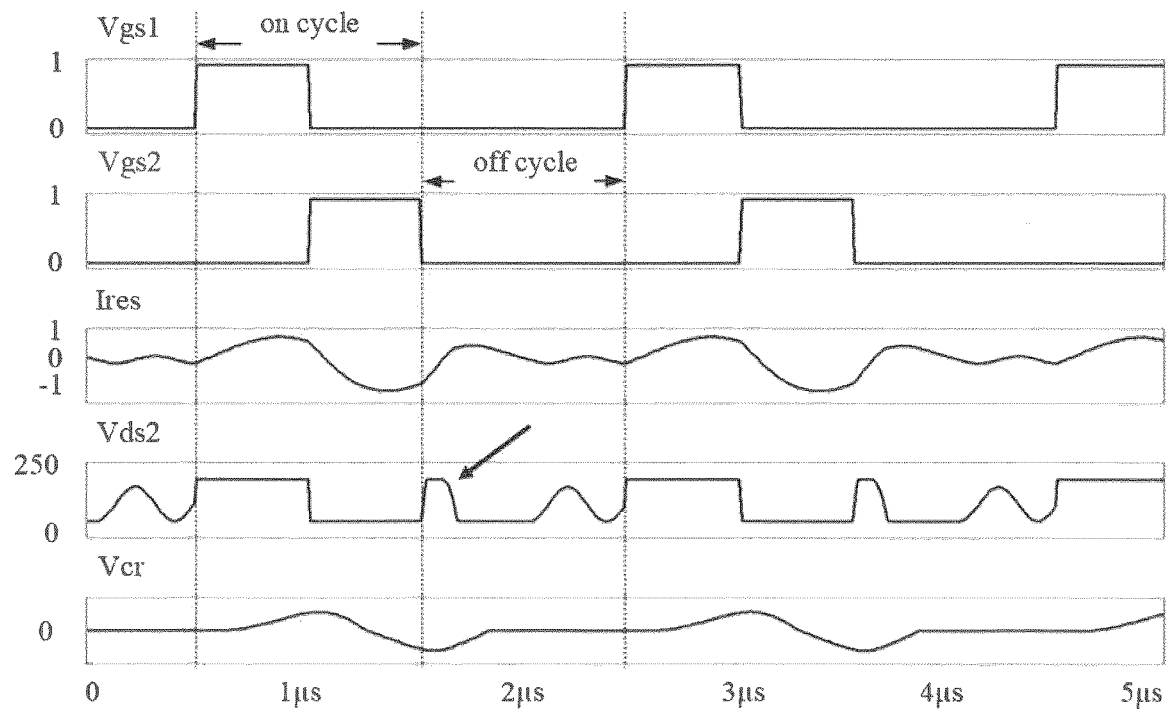
FIG. 31 is a plot showing energy feedback waveforms of power cycle modulation control at 9V output, for the simulation of FIG. 27.

FIG. 31 shows the waveform of the energy feedback problem after the last switching cycle of the on cycle operation mode is finished. It can be observed that after Q2 is turned off in the previous on cycle operation mode (N1 cycle), the resonant current still has a large value and it will keep freewheeling until reaches steady state after attenuation. Also according to the voltage waveform of resonant capacitor Cr, $V_{Cr}$, is still high at the transition which indicates a certain amount of energy is stored in the resonant tank. This part of the energy will be sent back to the source during the off cycle operation mode and the voltage Vds2 will rise again. More conduction loss is introduced in this process as a consequence.

Figure 32A:
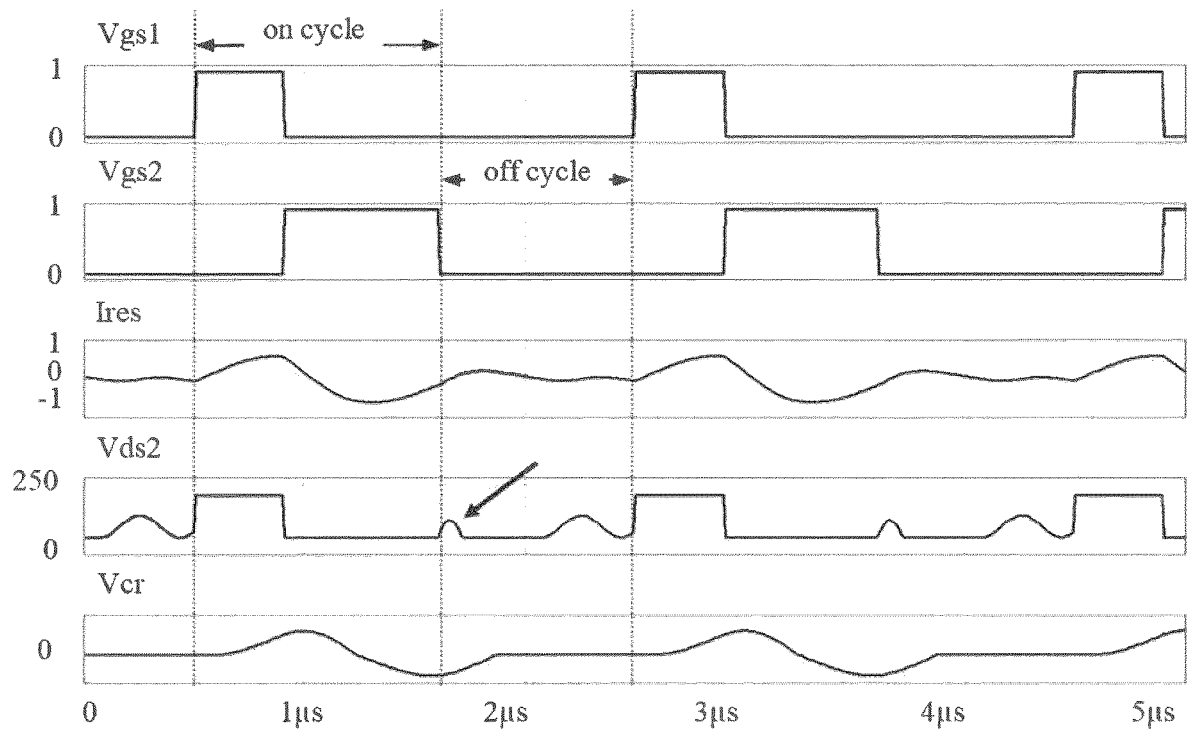
FIG. 32A is a plot showing extended on-time control waveforms of power cycle modulation control at 9V output, for the simulation of FIG. 27.

The energy feedback problem results because the resonant current is not zero when Q2 is turned off at the end of the on cycle operation mode. The energy stored in the resonant inductor will be released to the input source when Q2 is turned off. This problem can be solved by extending the on time of Q2 (longer conduction time of Q2) for the last switching period of the on cycle operation mode, as shown in FIG. 32A by the longer high voltage level of Vgs2. This is referred to herein as extended on-time modulation. The controller senses the resonant inductor current during the last switching period of the on cycle operation mode and turns off Q2 when the resonant current, Ires, is very small (in the ideal case, when Ires=0). FIG. 32A shows the key waveforms with extended on-time. At the last switching period of the on cycle operation mode, the pulse width of Vgs2 is extended to keep Q2 turned on for a longer period of time. The resonant current will transfer most of the energy to the secondary side during the extended on time. Then, Q2 is turned off when the resonant current is very small (or zero in the ideal case). With less energy stored in the resonant tank, Vds2 will not increase to a very high value and the loss is decreased.

Asymmetrical Switching Mode

Figure 32B:
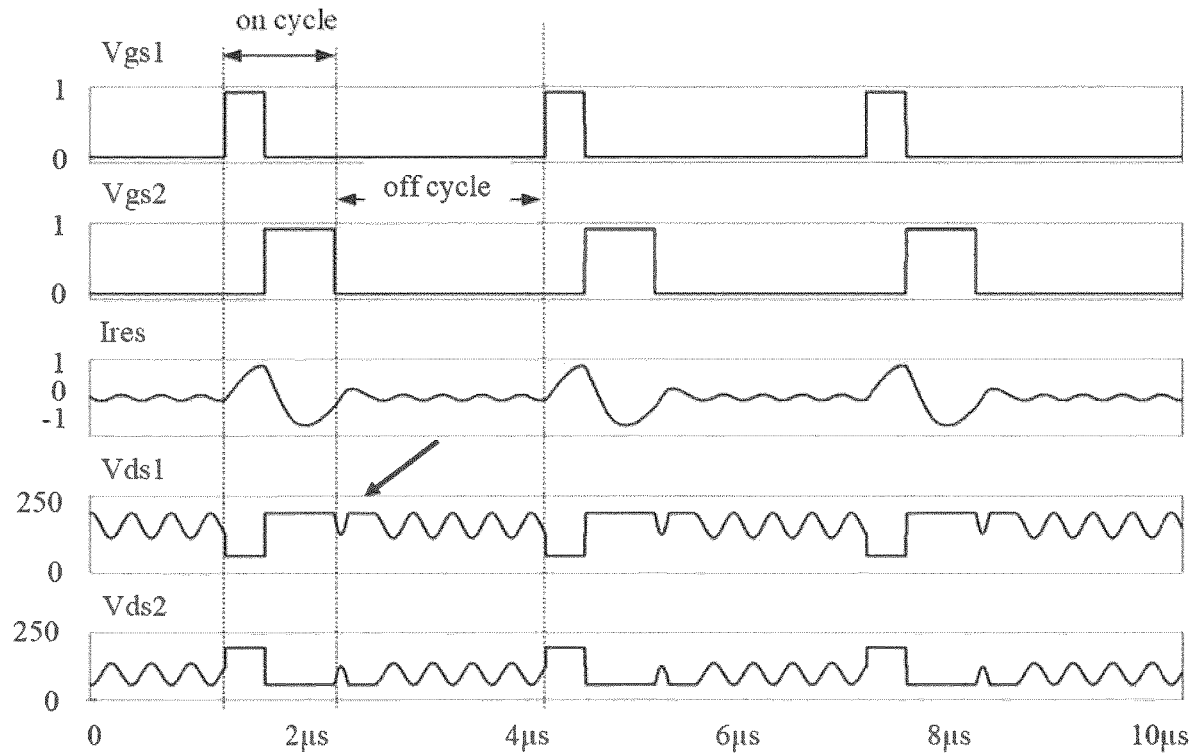
FIG. 32B is a plot showing Vds1 and Vds2 waveforms of the MOSFETs at 5V output, for the simulation of FIG. 27.

During the off cycle operation mode, the circuit starts to resonate between the resonant inductor, parasitic inductance in the circuit, and the output capacitor of the MOSFET (Coss) after the transition from on cycle operation mode to off cycle operation mode is finished. Consider N1=1, N2=3, and Vo=5V as an example, as illustrated in FIG. 32B, the voltage across Q2 (Vds2) resonates from zero and the voltage across Q1 (Vds1) resonates from the input voltage level (200V in the simulation). This waveform is induced by the resonance between the resonant inductor and the output capacitor Coss of the two MOSFETs. Since the steady state resonant voltage of Vds1 is the input voltage it will resonate close to the input voltage level. When Q1 is turned on at the next on cycle operation mode, the voltage across Q1 will be close to Vin and therefore, zero voltage turn on of Q1 cannot be achieved for the first switching period of the next on cycle operation mode.

To solve this problem, an asymmetrical switching mode is introduced during on cycle operation mode N1. It is noticed that during off cycle operation mode, Vds1 will resonate at about the input voltage because Q1 is turned off and Q2 is turned on in the last switching cycle of the on cycle operation mode. Thus Vds1 is Vin (200V in the simulation case) and Vds2 is 0V before the off cycle operation mode starts. Therefore, they will start to resonate from this initial condition.

Figure 33:
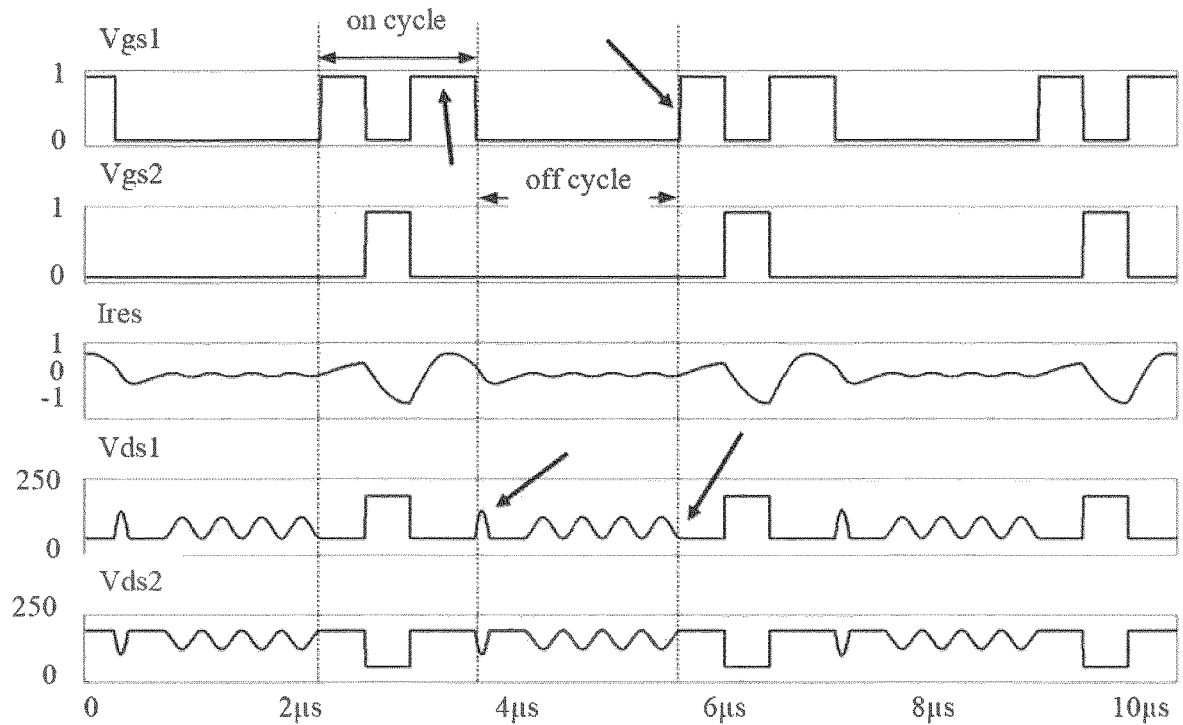
FIG. 33 is a plot showing Vds1 and Vds2 waveforms of the MOSFETs at 5V output, for an asymmetrical switching mode in the simulation of FIG. 27.

In the asymmetrical switching mode, the MOSFET to be turned off during the previous on cycle operation mode is the same MOSFET to be turned on for the next on cycle operation mode. That is, Q1 is turned off when the resonant current reduces to zero in the last switching cycle of the previous on cycle operation mode. Note that the on time of the Vgs1 for the second cycle (in FIG. 33) is longer than the first cycle in FIG. 33. Consequently, Vds1 is oscillating from 0V in the off cycle operation mode. It is noted that due to parasitic losses in the circuit, the peak voltage of Vds1 is less than Vin. If Q1 is turned on in the next on cycle operation mode when Vds1 is zero, zero voltage turn on of Q1 can be achieved for the first switching period of the next on cycle operation mode, as shown in FIG. 33 (note the difference in Vds1 waveforms between FIG. 32A and FIG. 33).

Figure 34:
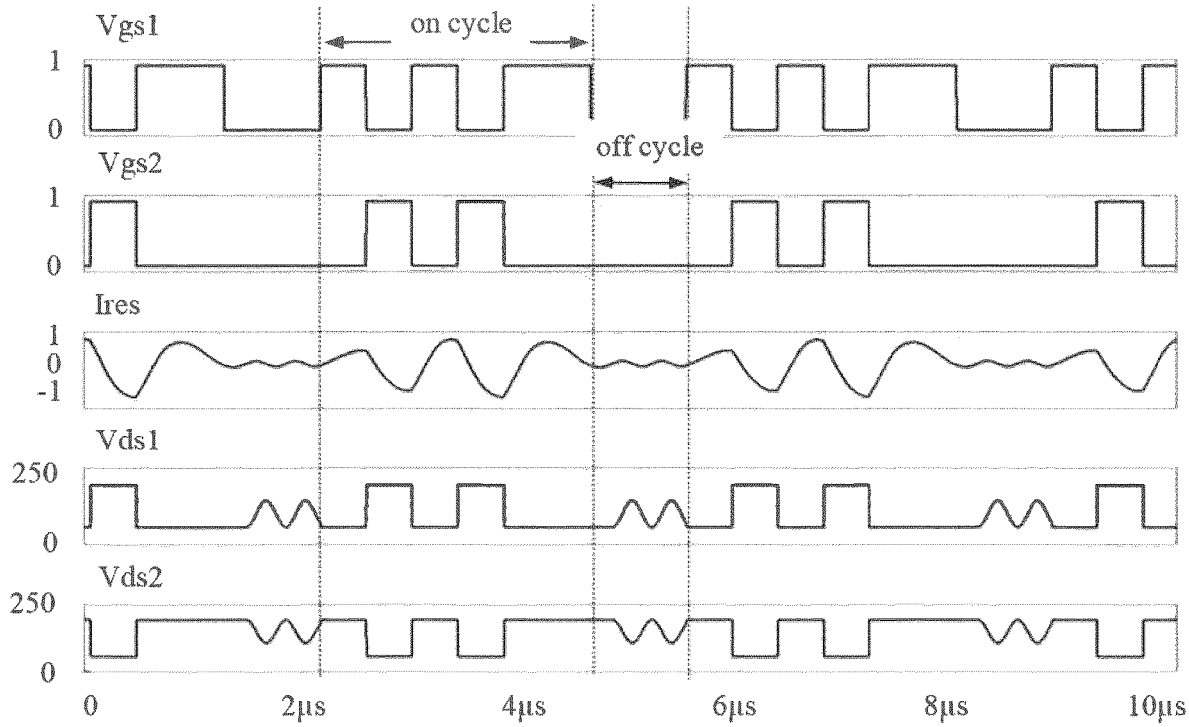
FIG. 34 is a plot showing key waveforms for an asymmetrical switching mode at 9V output, in the simulation of FIG. 27.

With the asymmetrical switching mode, N1 and N2 are no longer integers. FIG. 33 shows the Vds waveforms using asymmetrical switching with N1=1.5, N2=2.5 for 5V output. Vds1 resonates from 0V and it is able to drop to zero voltage in the steady state. After the off cycle operation mode is finished, Vds1 is sensed and Q1 is turned on to start the next on cycle operation mode at zero voltage condition. FIG. 34 shows the key waveforms for N1=2.5, N2=1.5 for 9V output. Zero voltage turn on is also achieved.

Therefore, in order to achieve zero voltage switching for the first switching period during the on cycle operation mode, Q1 is turned off during the previous on cycle operation mode and then the same MOSFET (Q1) is turned on for the next on cycle operation mode. In this way, zero voltage switching can be achieved. If the timing is not exact, the voltage at which Q1 will be turned on at the first switching period of the next on cycle operation mode will be small, or close to zero. The output voltage is controlled by the T_off through feedback loop.

The above analysis is based on a parallel resonant converter. It is noted that these two strategies can also be used for other resonant converters with voltage source output, such as an LCC resonant converter, as shown in FIG. 14, a SR converter, LLC resonant converter, etc. The details are not repeated here.

It is noted that in the above description, example, and simulation, it is assumed that during the off cycle operation mode, both the top switch (Q1) and bottom switch (Q2) are turned off. As noted above, the off cycle operation mode can also be implemented by turning off the top switch Q1 and turning on the bottom switch Q2. This implementation will have advantage when GaN (gallium nitride) switches are used for Q1 and Q2. Also, if Q2 is kept on during off cycle operation, Q2 should at first be turned off before Q1 can be turned on at beginning of the next on cycle operation mode.

In addition, another implementation example for N1 generation as shown in FIG. 22 is that when the output voltage is low and output current is also low, the number of switching cycles is reduced during on cycle operation mode (the value of N1). In this way, the time period of off cycle operation mode (T_off) can be reduced. For example, the following two operating conditions can achieve the same output requirement of Vo=5V and Io=0.5 A for a series resonant converter.

The first operation condition is to set N1=10 and during on cycle operation mode, the average output current Io1=2.5

A and switching frequency is Fs1=1 MHz. Then T_on=10*1 us=10 us. Then the required time period of the off cycle operation mode should be 40 us to get the average output current of 0.5 A. In this case, the control time period Tcontrol_1=10 us+40 us=50 us. The output voltage ripple frequency will be Fcontrol 1=1/50 us=20 kHz.

The second operation condition is to set N1=5 and during on cycle operation mode, the average output current Io1=2.5 A and the switching frequency Fs1=1 MHz (both are same as the first operation condition). Then, T_on=5*1 us=5 us and T_off=20 us to get Io=0.5 A. The Tcontrol_2=25 us. The output voltage ripple frequency will be Fcontrol_2=1/25 us=40 kHz.

Comparing the above two operation conditions, the second operation condition is advantageous because the control frequency is higher and therefore, the output voltage ripple will be smaller. Therefore, N1 can be different for different input and output conditions and can be optimized.

Similarly, Fs1 can also be optimized based on the operation condition. For example, when the input voltage is high, higher Fs1 should be used to limit the resonant current. Similarly, when the output voltage is low, the reflected voltage to the primary side is lower and the resonant current will be higher. Again, in order to limit the resonant current, the switching frequency Fs1 should be increased.

Implementation Examples

Constant PCM Control Frequency (or Control Period) Operation

It is noted that there are two time periods in PCM operation. One is the switching period of the resonant converter during the on cycle operation mode, i.e., in this description, Ts1=1/Fs1. The other is the PCM period, also referred to as the control period Tcontrol. The PCM period is defined as (as shown in FIG. 6):

$$T\text{control} = T\text{on} + T\text{off} \tag{12}$$

Tcontrol may be a constant value for easier implementation. For example, Tcontrol may be fixed at 50 us. Then, the equivalent PCM frequency, or control frequency, Fcontrol, is 20 kHz. Fcontrol can be viewed as the on-off frequency of the switching converter.

In this case, the input voltage Vin and the output voltage Vo will be used to select (1) Fs1 (the switching frequency during on cycle operation); (2) N1 (the number of switching cycles during on cycle operation); and (3) the off time, T off.

The benefit of a constant PCM control frequency is that audible noise can be avoided under all operating conditions. At very light load, the T_on time can be set very small by setting the switching frequency Fs1 high and the number of switching cycles N1=1.

Non-Zero T_Off Time Operation

In the above description, it is assumed that the minimum T_off time is zero. In this case, the max Power Cycle Ratio (PCR): PCR=T_on/Tcontrol=T_on/(T_on+T_off) can be 100%.

It is noted that in some conditions, it is more desirable to set the minimum T off time to a small value, e.g., less than 25%, or less than 10%, or less than 5% of the control period, such as 2% of the control period, T_off_min=0.02*Tcontrol. For example, when T_off_min=2% of Tcontrol, T on max=0.98*Tcontrol. The max PCR, PCR_max=0.98*Tcontrol/Tcontrol=98%. This arrangement will bring more accurate PCR resolution when a low cost MCU is used. With a low cost MCU, the minimum time step (time resolution), T_step, is usually large, such as 32 ns or 100 ns. If it is assumed T_step=32 ns, PCR_max=98%, and Tcontrol=50 us. Then the T_off_min=0.02*50 us=1 us. If everything else is kept constant and if T_off is changed from 1 us to 1 us+32 ns=1.032 us, the PCR will be changed from 0.98 to (50−1.032)/50=0.97936. This represents a PCR change of (0.98−0.97936)/0.98=0.065%. This indicates that by changing one bit (32 ns) of T_off time, the output voltage will change by 0.065%, which is acceptable.

Similarly, if the minimum time step, T_step=100 ns=0.1 us, and Tcontrol=50 us and T_off_min=1 us, the PCR change from 0.98 to (50−1−0.1)/50=0.978. Or the PCR change will be (0.98−0.978)/0.98=0.2%. This is also a very small number for the output voltage change. It should be noted that T_step of 100 ns means the clock frequency of the MCU is only 10 MHz, which may be implemented with a very low cost MCU. It is noted that a clock frequency of 32 MHz (32 ns time step) is also a very low cost MCU.

Therefore, by setting T_off_min to a non-zero, but small value, such as 2% of Tcontrol, a very high output voltage resolution can be achieved even when a low cost MCU is used.

It is noted that if T off min is selected to be too high, the voltage or current rating for the resonant converter may be too high, which is not desirable. For example, this may be the case if T off min is selected as 0.5*Tcontrol. Then during T_on operation, the resonant converter will need to handle two times the load power. This will cause an over loading of the power circuits.

Both Fs1 and T_Off Determined by Output Voltage

It is noted that Fs1 and T off can be selected based on the input voltage Vin (through input voltage feedforward) and by the output voltage Vo (through output voltage error amplifier). A simplified implementation method is that both Fs1 and T_off are determined by the output error voltage:

$$V\text{error} = f(Vo - V\text{ref}) \tag{13}$$

In the above equation, Vref is the reference voltage. The output voltage will follow the reference voltage. The function f(Vo−Vref) could be implemented with proportional-integral (PI) control, or proportional-integral-differential (PID) control, or some other function.

If it is assumed that the switching frequency Fs1 is always higher than the resonant frequency of the resonant converter, the converter operates in inductive mode. In this case, the output voltage will decrease when the switching frequency Fs1 is increased. If the output voltage is significantly higher than the reference voltage, the Verror voltage is large. If the output voltage is close to or lower than the reference voltage, the error voltage Verror is small. Therefore, the following control method can be used:

(1) Verror<Verror_th, T_off is set to zero or set to T_off_min, the switching frequency, Fs1, is used to regulate the output voltage. It is noted that when Verror is small, Vo is close to Vref. Fs1=f0(Delta_error), where Delta_error is defined by equation (14). In this case, Fs1 is controlled by Verror, which is dependent on Vo. That is, Fs1 is controlled by Vo.

(2) If Verror>Verror_th, T_off is not zero (or not T_off_min). T_off>T_off_min and is changing based on Verror. In this case, Fs1 is controlled by Verror, which is dependent on Vo. That is, Fs1 is controlled by Vo.

We define $$\text{Delta error} = V_{error} - V_{error\_th} \quad (14)$$

Where Verror_th is a pre-determined threshold level. Then, Fs1 and T off can be determined from the following relations:

$$Fs1 = f1(\text{Delta\_error}) \quad (15.1)$$

$$T\_off = f2(\text{Delta\_error}) \quad (15.2)$$

The above implementation method means that during PCM operation, the switching frequency Fs1 during on cycle operation is determined by Verror, which is determined by the output voltage Vo. The T_off is also determined by Verror, which is determined by the output voltage. The mathematical function f1 and f2 as shown in equations (15.1) and (15.2) can be implemented as Proportional, Proportional-Integral (PI), or Proportional-Integral-Differential (PID) or some other form.

Figure 35:
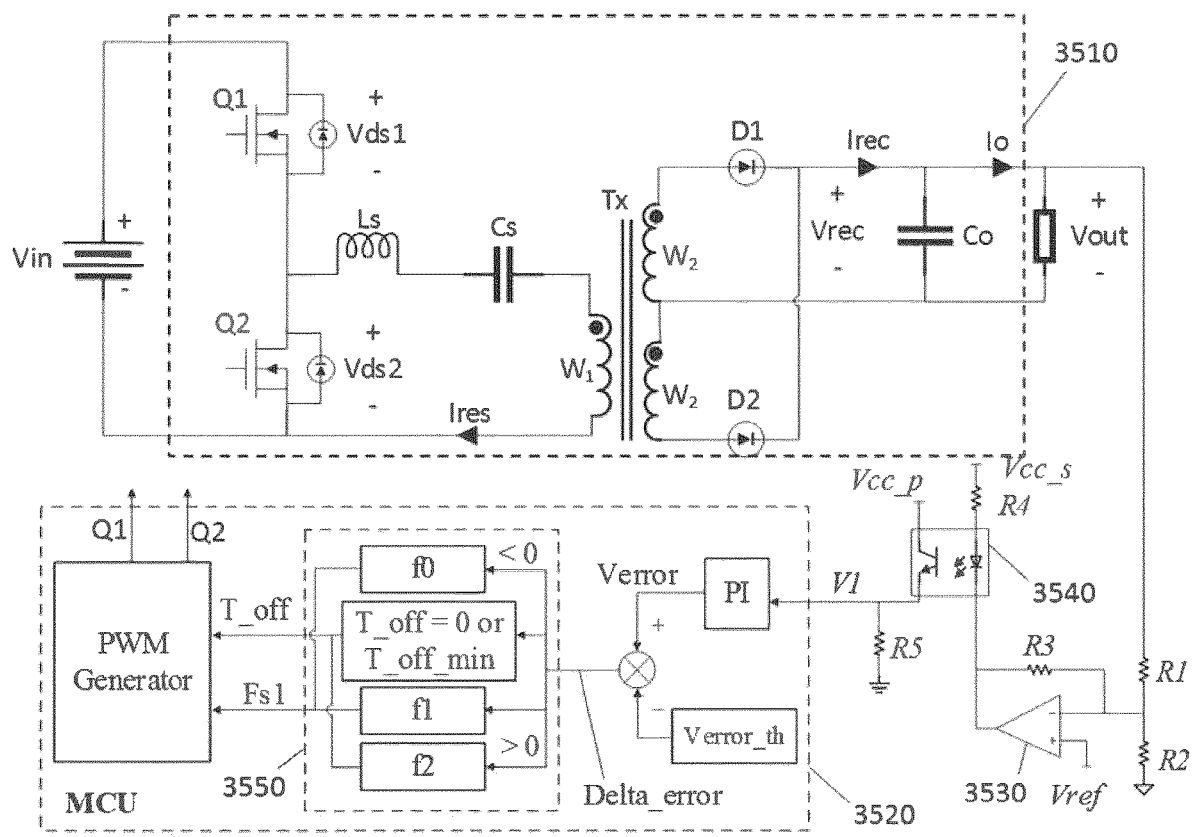
FIG. 35 is a circuit diagram showing a general implementation for selecting Fs1 and T_off, based on sensing the converter output voltage, according to one embodiment.

FIG. 35 is a block diagram of an implementation of this embodiment. The converter 3510 output voltage Vout is sensed and compared with a reference voltage Vref using an operational amplifier 3530 and then transferred as voltage V1 to the MCU 3520 using an isolation device such as an opto-coupler 3540. V1 is subjected to analog to digital conversion (not shown). Verror is the PI (proportional-integral) output of V1. Verror_th is a control parameter, a threshold voltage that is used with Verror to determine the Delta_error signal. Verror_th is used to determine if the error voltage is large or small. For example, if the output voltage is significantly different from the reference, the error voltage is large which causes the output voltage to be corrected quickly. The Delta_error signal is used in the function block 3550 to generate Fs1 and T_off signals, calculated based on functions f0, f1, and f2. Fs1 and T off are fed to a PWM generator to produce the gating signals for Q1 and Q2 of the half bridge converter 3510.

Figure 36:
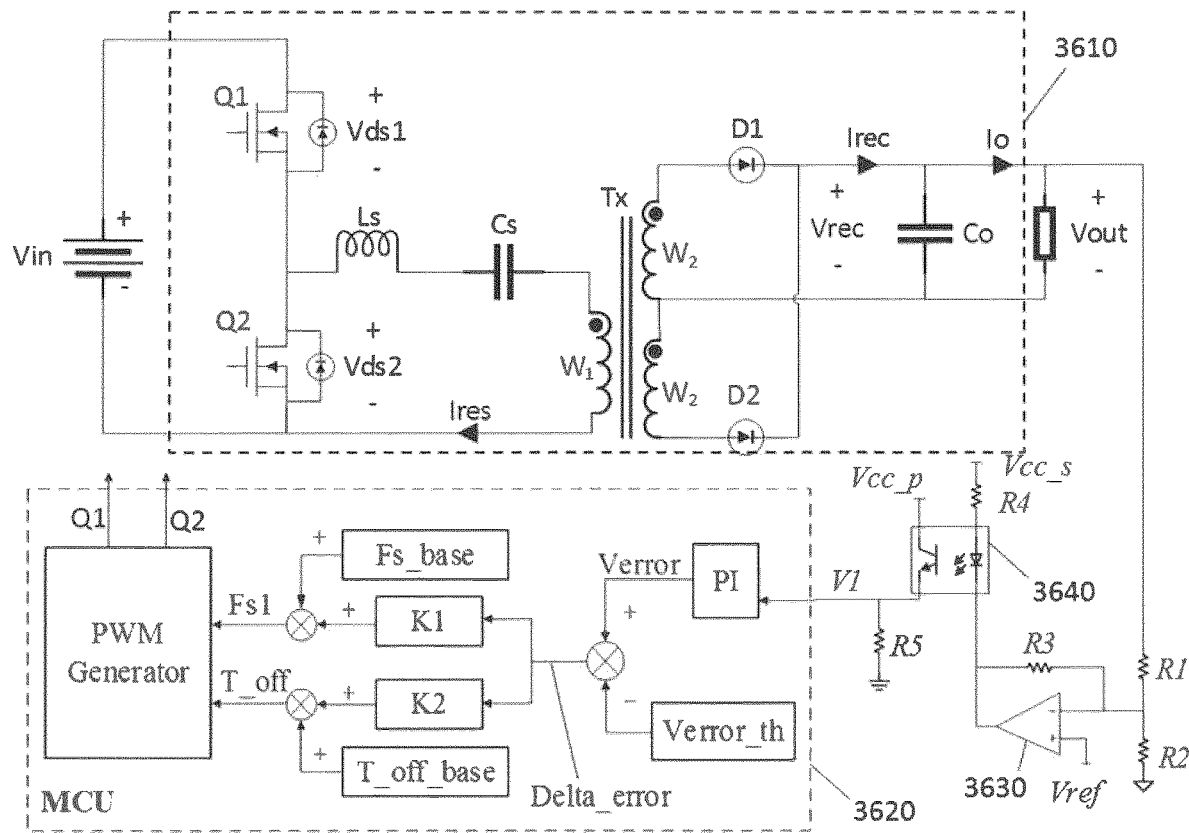
FIG. 36 is a circuit diagram showing a simplified implementation for selecting Fs1 and T_off, based on sensing the converter output voltage, according to one embodiment.

FIG. 36 is a block diagram of a simplified implementation. The converter 3610 output voltage Vout is sensed and compared with a reference voltage Vref using an operational amplifier 3630 and then transferred as voltage V1 to an MCU 3620 using an isolation device such as an opto-coupler 3640. V1 is subjected to analog to digital conversion (not shown). According to this embodiment, Fs1 and T_off are selected by applying the functions K1 and K2, which are based on the following relationships:

$$Fs1 = K1 * \text{Delta error} + Fs\_base \quad (16.1)$$

$$T\text{ off} = K2 * \text{Delta error} + T\_off\text{ base} \quad (16.2)$$

With the control law as expressed in equations (16.1) and (16.2), when Delta_error is increased, the output voltage is larger than the reference voltage. The control strategy increases both Fs1 and T_off. Increasing Fs1 will lead to reducing Vo. Increasing T_off will also lead to reducing Vo. Therefore, the output voltage will be reduced and the error voltage will be reduced.

Other functions of f1 and f2 in equations (15.1 and 15.2) can also be identified to achieve output voltage regulations.

The above description indicates that with the PCM control strategy, both the on cycle operation mode and the off cycle operation mode will be present. The switching frequency during on cycle operation mode, Fs1, is determined by the error voltage, which is determined by the output voltage. That is, Fs1 is also determined by the output voltage. The T_off time is also determined by the error voltage, which is determined by the output voltage. The T_off time is determined by the output voltage.

Special Case with Fixed Fs1 when Verror>Verror_Th

One special case for the above-described control strategy is that Fs1 is set at Fs1_max under the following condition:

$$Fs1 = Fs1 \text{ max when } V_{error} > V_{error\_th} \quad (17)$$

Where Fs1_max is the maximum switching frequency when the converter operates at on cycle operation mode. For example, Fs1_max may be equal to or greater than 2×, or 3×, or 4×, or 5× the resonant frequency of the converter. The off time T_off is adjusted based on Delta_error. It is noted that under the assumption that the switching frequency is higher than the resonant frequency, the output voltage will be reduced when the switching frequency is increased. Setting the maximum switching frequency will limit the switching loss. The output voltage can be adjusted/controlled by T_off.

When Verror<Verror th, T off is set to zero (or T_off_min) and the switching frequency Fs1 is controlled by the error voltage.

Special Case with Variable T_on and T_Off

In the above description, the control period Tcontrol=T on+T off is assumed to be constant, or almost constant. When T off is selected, T_on is changed accordingly, T_on=Tcontrol−T off. This is considered as a desirable operating condition. Other methods can also be used to determine T on and T off. One such embodiment is described as follows:

(1) During on cycle operation mode, the switching frequency Fs1 is controlled by the error voltage Verror, which is controlled by the output voltage. That is, the switching frequency Fs1 is controlled by the output voltage Vo, as described above.

(2) The on cycle operation mode time period T_on is controlled by comparing the instantaneous output voltage Vo(t) with an output voltage up-limit level, Vo_up. When Vo(t)<Vo_up, the converter operates at on cycle operation mode and the instantaneous output voltage Vo(t) will rise. When Vo(t)>Vo_up, the converter changes to off cycle operation mode and the instantaneous output voltage Vo(t) will fall.

(3) The off cycle operation mode time period T_off is controlled by comparing the instantaneous output voltage Vo(t) with an output voltage low limit, Vo_low. When Vo(t)>Vo_low, the converter operates at off cycle operation mode and the instantaneous output voltage Vo(t) will fall. When Vo(t)<Vo_low, the converter changes to on cycle operation mode and the output voltage will rise.

With this control method, the converter operates between on cycle operation mode and off cycle operation mode alternatively and the switching frequency during on cycle operation mode Fs1 is controlled directly or indirectly by the output voltage.

With this control method, the instantaneous output voltage Vo(t) is always between Vo_up and Vo_low. The steady state average output voltage Vo is determined by Vo_up and Vo−low. It is noted that the T on and T_off is not controlled directly and therefore, the control period Tcontrol=T_on+T off is not a constant, and it could vary over a wide range depending on, e.g., the input voltage, output voltage, load current, the parameters of the power circuit, etc.

For example, if the load current is small, it will take a longer time for the instantaneous output voltage to fall from Vo_up to Vo_low during the T_off period. Similarly, if the load current is high, it takes more time for the output voltage to rise from Vo_low to Vo_up.

It is noted that with this implementation embodiment, the T_off cannot be set to zero since it always takes some time for the output voltage to fall from Vo_up to Vo_low. Because of non-zero T off time, the resonant converter should be designed to handle more power than the maximum output power. For example, if (a) under full load operation when the load consumes Po_max, and (b) the minimum T off time is 30% of Tcontrol, then the resonant converter should be designed to process Po_max/(1−0.3)=1.43*Po_max. In other words, if the maximum load power is 65 W, the power converter should be designed to handle 1.43*65=93 W.

Although the embodiment described above is not optimal, it can achieve power cycle modulation operation as described herein.

Vin Feedforward to Determine Fs1

In the above embodiment, the input voltage feedforward can be used to directly increase the switching frequency during the on cycle operation. It is noted that since the resonant converter operates at inductive mode, when input voltage increases, the switching frequency should also be increased so that the resonant current remains the substantially constant (or changes little). In this way, the impact of the input voltage variation can be reduced. That is, Fs1 can be controlled by Vin and Verror. Verror is dependent on the output voltage.

Different Fs1 During the Same Control Period, Tcontrol

As described above, it is assumed that Fs1 remains constant during one control period, Tcontrol. In practice, it is possible to use different Fs1 during same control period. For example, Fs1A, Fs1B, and Fs1C can be used during the on cycle operation mode time period, T_on. This can increase the response time of the converter.

For example, if the input voltage increases suddenly in the middle of one on cycle operation mode period T_on the switching frequency Fs1 can be increased immediately to maintain the resonant current substantially unchanged. If the switching frequency does not change immediately, the resonant current will increase and the output voltage will increase during the transient operation condition.

Similarly, Fs1 can also be changed by the error output to achieve better transient response. A detailed implementation is not described herein, but can be understood by those skilled in art.

In the above analyses, it is assumed that the switching frequency is higher than the resonant frequency, or the resonant converters operate at inductive mode. When the switching frequency is increased, the output voltage is reduced. It is noted that PCM control embodiments can also be used when the switching frequency is lower than the resonant frequency, or the resonant converters operate at capacitive mode. In capacitive mode operation, the output voltage will be reduced when switching frequency is increased, that is, the control law is reversed. This is readily understood by those skilled in art.

EQUIVALENTS

While the invention has been described with respect to illustrative embodiments thereof, it will be understood that various changes may be made to the embodiments without departing from the scope of the invention. Accordingly, the described embodiments are to be considered merely exemplary and the invention is not to be limited thereby.

The invention claimed is:

1. A method for controlling a resonant power converter output voltage, comprising:
    operating the power converter according to a control period Tcontrol comprising an on cycle operation mode for a duration T_on and an off cycle operation mode for a duration T_off;
    sensing a converter output voltage and using the sensed output voltage to select a switching frequency Fs1 during the on cycle operation mode, a first selected number of switching cycles corresponding to the duration T_on, and the duration T_off;
    wherein an output voltage Vo of the power converter is regulated to a selected value based on a ratio of (T_on):(T_on+T_off).

2. The method of claim 1, comprising producing a first voltage Vo1 during T_on and producing a second voltage Vo2 during T_off.

3. The method of claim 2, comprising producing Vo1 during T_on using a first switching frequency and producing Vo2 during T_off using a second switching frequency.

4. The method of claim 3, wherein the first switching frequency is greater than the second switching frequency.

5. The method of claim 1, comprising selecting a minimum value T_off min for the duration of T_off, wherein T_off_min is less than 25% of Tcontrol.

6. The method of claim 5, wherein T_off_min is 0.

7. The method of claim 1, wherein the duration of T_on is equal to a first selected number of switching cycles N1, wherein one switching cycle is 1/Fs1.

8. The method of claim 1, wherein Tcontrol comprises only the on cycle operation mode of duration T_on.

9. The method of claim 1, comprising turning the power converter off for a second selected number of switching cycles corresponding to the duration T_off.

10. The method of claim 1, comprising adjusting the switching frequency during the on cycle operation mode.

11. The method of claim 1, comprising using at least first and second switching frequencies during the on cycle operation mode.

12. The method of claim 1, comprising sensing a converter input voltage and the converter output voltage;
    using the sensed input and output voltages to select the switching frequency during T_on and the number of switching cycles corresponding to the duration T_on; and
    using the sensed output voltage to select the duration T_off.

13. The method of claim 1, comprising sensing a converter input voltage and the converter output voltage;
    using the sensed input and output voltages to select the switching frequency during T_on, the number of switching cycles corresponding to the duration T_on, and the duration T_off.

14. The method of claim 1, comprising sensing a converter input voltage and the converter output voltage;
    using the sensed input and output voltages to select the number of switching cycles corresponding to the duration T_on; and
    using the sensed output voltage to select the switching frequency during T_on and the duration T off.

15. The method of claim 1, comprising sensing a converter input voltage and a converter output voltage;
    using the sensed input and output voltages to select the number of switching cycles corresponding to the duration T_on and the duration T_off; and using the sensed output voltage to select the switching frequency during T_on.

16. The method of claim 1, wherein the power converter is selected from a parallel resonant converter, a series resonant converter, a LLC resonant converter, and a LCC resonant converter.

17. A controller for a power converter, wherein the controller implements the method of claim 1.

18. The controller of claim 17, implemented in digital technology.

19. The controller of claim 18, wherein the power converter is selected from a parallel resonant converter, a series resonant converter, a LLC resonant converter, and a LCC resonant converter.

20. A power converter comprising the controller of claim 17.

21. The power converter of claim 20, wherein the power converter is selected from a parallel resonant converter, a series resonant converter, a LLC resonant converter, and a LCC resonant converter.

22. The power converter of claim 20, wherein the power converter provides output voltages compatible with a plurality of devices selected from cell phones, tablet computers, and notebook computers.

\* \* \* \* \*